US009135338B2

(12) United States Patent
Yates et al.

(10) Patent No.: US 9,135,338 B2
(45) Date of Patent: Sep. 15, 2015

(54) SYSTEMS AND METHODS FOR EFFICIENT FEATURE BASED IMAGE AND VIDEO ANALYSIS

(75) Inventors: J. Harlan Yates, Melbourne, FL (US); Mark Rahmes, Melbourne, FL (US); Patricia Brown, Melbourne, FL (US); Timothy B. Faulkner, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 413 days.

(21) Appl. No.: 13/409,639

(22) Filed: Mar. 1, 2012

(65) Prior Publication Data

US 2013/0230250 A1 Sep. 5, 2013

(51) Int. Cl.
| G06K 9/46 | (2006.01) |
| G06K 9/66 | (2006.01) |
| G06F 17/30 | (2006.01) |
| G06K 9/62 | (2006.01) |
| G06K 9/00 | (2006.01) |

(52) U.S. Cl.
CPC ...... *G06F 17/30823* (2013.01); *G06F 17/3079* (2013.01); *G06F 17/30241* (2013.01); *G06K 9/0063* (2013.01); *G06K 9/6254* (2013.01)

(58) Field of Classification Search
None
See application file for complete search history.

(56) References Cited

U.S. PATENT DOCUMENTS

| 4,135,147 | A | 1/1979 | Riganati et al. |
| 6,654,690 | B2 | 11/2003 | Rahmes et al. |
| 7,107,179 | B2 | 9/2006 | Malchi et al. |
| 7,376,513 | B2 | 5/2008 | Rahmes et al. |
| 7,391,899 | B2 | 6/2008 | Rahmes et al. |
| 7,702,016 | B2 | 4/2010 | Winder et al. |
| 7,732,768 | B1 | 6/2010 | Haigh et al. |
| 7,804,982 | B2 | 9/2010 | Howard et al. |
| 7,912,255 | B2 | 3/2011 | Rahmes et al. |
| 8,275,175 | B2 | 9/2012 | Baltatu et al. |
| 8,390,684 | B2 * | 3/2013 | Piran et al. ..................... 348/143 |
| 8,655,107 | B2 | 2/2014 | Okamoto |
| 2003/0098869 | A1 | 5/2003 | Arnold et al. |
| 2003/0103659 | A1 | 6/2003 | Hara et al. |
| 2003/0156824 | A1 | 8/2003 | Lu |
| 2004/0218099 | A1 | 11/2004 | Washington |

(Continued)

OTHER PUBLICATIONS

Lewis, P., et al., "Spatial Video and GIS", International Journal of Geographical Information Science, vol. 25, No. 5, May 2011, 697-716.

(Continued)

*Primary Examiner* — Thomas Conway
(74) *Attorney, Agent, or Firm* — Robert J. Sacco, Esq.; Fox Rothschild LLP

(57) ABSTRACT

Systems (100) and methods (300) for efficient spatial feature data analysis. The methods involve simultaneously generating chip images using image data defining at least a first image and video chips using video data defining at least a first video stream. Thereafter, an array is displayed which comprises grid cells in which at least a portion of the chip images is presented, at least a portion of the video chips is presented, or a portion of the chip images and a portion of the video chips are presented. Each chip image comprises a panned-only view, a zoomed-only view, or a panned-and-zoomed view of the first image including a visual representation of at least one first object of a particular type. Each of the video chips comprises a segment of the first video stream which include a visual representation of at least one second object of the particular type.

20 Claims, 25 Drawing Sheets

(56) References Cited

U.S. PATENT DOCUMENTS

| | | | |
|---|---|---|---|
| 2006/0110128 A1* | 5/2006 | Dunton et al. | 386/52 |
| 2006/0120624 A1 | 6/2006 | Jojic et al. | |
| 2006/0259856 A1 | 11/2006 | Atkins | |
| 2008/0279416 A1 | 11/2008 | Lo et al. | |
| 2008/0319723 A1 | 12/2008 | Smith et al. | |
| 2009/0027417 A1 | 1/2009 | Horsfall et al. | |
| 2009/0109298 A1 | 4/2009 | Wan | |
| 2009/0219154 A1 | 9/2009 | Kukula et al. | |
| 2010/0100835 A1 | 4/2010 | Klaric et al. | |
| 2010/0135540 A1 | 6/2010 | Cervantes | |
| 2010/0172590 A1 | 7/2010 | Foehr et al. | |
| 2010/0232659 A1 | 9/2010 | Rahmes et al. | |
| 2010/0239165 A1* | 9/2010 | Wu et al. | 382/176 |
| 2011/0044513 A1 | 2/2011 | McGonagle et al. | |
| 2011/0044514 A1 | 2/2011 | Rahmes et al. | |
| 2011/0262013 A1 | 10/2011 | Rahmes et al. | |
| 2012/0017152 A1* | 1/2012 | Matsuda et al. | 715/723 |
| 2012/0272185 A1 | 10/2012 | Dodson et al. | |
| 2013/0044219 A1 | 2/2013 | Burry et al. | |
| 2013/0088600 A1 | 4/2013 | Wu et al. | |
| 2013/0120454 A1 | 5/2013 | Shechtman et al. | |

OTHER PUBLICATIONS

Wilson, S., et al., "Developement of a Digital Video System for Remote Sensing of Coasts", International Conferenceon Information Technology, 2001. http://www.computer.org/portal/web/csdl/doi.10.1109/ITCC.2001.918820.

Zhu, Z., "Geo-Mosaic for Environmental Monitoring", CUNY City CollegeVisual Computing Laboratory, http:/www-cs.ccny.cuny.edu/~zhu/geomosaic.html.

Schultz, H., et al., "A System for Real-Time Generation of Georeferenced Terrain Models", Proceedings SPIE Symposium on Enabling Technologies for Law Enforcement, 2000. http:/citeseerx.ist.psu.edu/viewdoc/summary? doi=10.1.1.121.6475.

Oksanen, J., "Tracing the Gross Errorsof Dem. Visualization Techniques for Preliminary Quality Analysis", Proceedings of the 21st International Cartographic Conference (ICC), Durban, South Africa, Aug. 10-16, 2003.

Timmons, G., "Weed Mapping Hi-TEch Breakthrough for Invasive Plants", [online] Retrieved on Dec. 10, 2013. Retrieved from: http://www.nature.org/ourinitiatives/regions/northamerica/unitedstates/hawaii/explore/hi-tech-breakthrough-for-invasive-plants.xml.

Reiners, W., et al., "Statistical Evaluation of the Wymoning and Colorado Landcover Map Thermatic Accuracy Using Aerial Videography Techniques", May 2000, [online]. Retrieved from: https://ndis1.nrel.colostate.edu/cogap/reprot/colandcov_acc.pdf.

Souris, M., "Aerial Videography; Principles and Guidelines of Implementation"; Aerial Videography—UNHRC-IRD (ex-Orstom), 1999, pp. 1-54.

Slaymaker, D., "Using Georeferenced Large-Scale Aerial Videography as a Surrogate for Gound Validation Data", [online] Retrieved on Dec. 10, 2013; from: http://link.springer.com/chapter/10.1007%2F978-1-4615-0306-4_18#.

Ambagis, S., et al., "Very High-resolution Imagery for Remote Sensing in Hawaii", Progress on the CAO Hyperpectral / LIDAR Imagery Project, [online] Retrived on Dec. 10, 2013; http://www.slideshare.net/higicc/progress-on-the-cao-hyperspectral-lidar-imagery-project.

Information about Related Patents and Patent Applications, see section 6 of the accompanying information Disclosure Statement Letter, which concerns Related Patents and Patent Applications.

(Authors Unknown), Simple random sample, Wikipedia entry, as archived on Dec. 14, 2010, 18 pages as retrieved from http://en.wikipedia.org/windex/php?title_Simple_random_sample&oldid=402414410 on Apr. 19, 2015, 3 pages.

Neteler and Mitasova, "Open Source GIS: GIS Approach" 2008, Third Ed. The International Series in Egineering and Computer Science, Springer, New York, vol. 773, 417 pages. 80 illus.

* cited by examiner

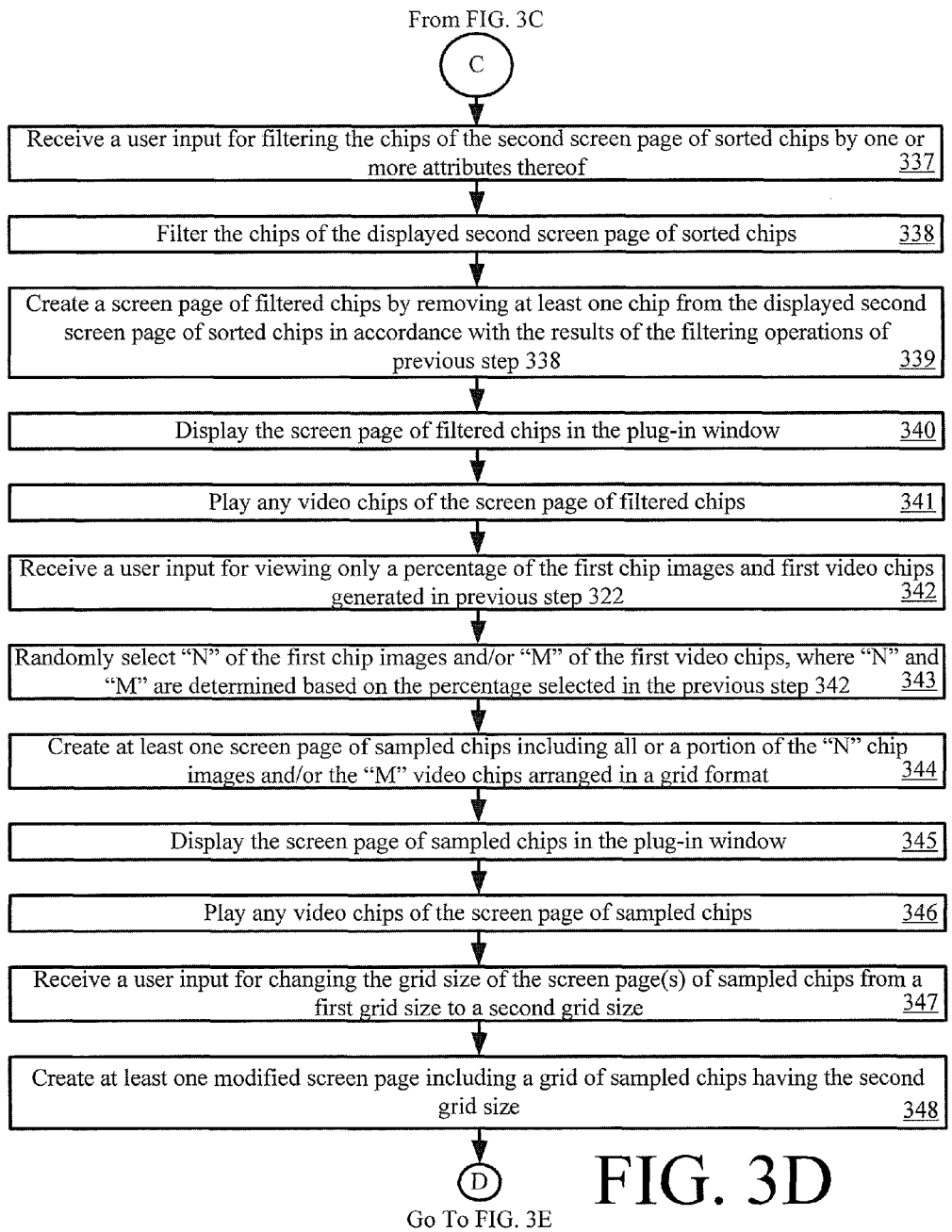

SYSTEMS AND METHODS FOR EFFICIENT FEATURE BASED IMAGE AND VIDEO ANALYSIS

BACKGROUND OF THE INVENTION

1. Statement of the Technical Field

The invention concerns computing systems. More particularly, the invention concerns computing systems and methods for efficient feature based image and video analysis.

2. Description of the Related Art

There are many known imagery systems that collect and maintain spatial data. Such imagery systems include satellite based systems which collect imagery data covering particular areas of the Earth. The imagery data is typically analyzed for a variety of reasons, such as for surveillance purposes, quality control purposes and/or change detection purposes. The analysis often involves manually analyzing the imagery data over an area of interest. Such manual analysis is often achieved using a computer executing image analysis software (e.g., ESRI® ArcMap® Geospatial Information System ("GIS") software, SOCET SET® software, FALCONVIEW® software, ADOBE® PHOTOSHOP® software, computer aided design software, and computer aided manufacturing software). In this scenario, only a portion of a high resolution image may be displayed to an operator at any given time. As such, the software provides a pan function and a zoom function. The pan function allows the operator to change a viewport from one part of an image to another part of the image. The zoom function allows the operator to change from a distant view of an image to a more close-up view (zoom in) of the image, and vice versa (zoom out). The pan and zoom operations are typically enabled by the operator using a computer mouse, joy stick and/or gestures.

During the image analysis process, the operator manually inspects the area of interest by: (a) obtaining feature data specifying locations and characteristics of a plurality of objects (e.g., gas stations); (b) "panning" to an area of interest within an image that is supposed to include a visual representation of at least one of the objects; (c) "zooming in" to obtain a close-up view of the area of interest; (d) visually comparing the current image to the feature data to determine if the object is still present in the area of interest and/or has the characteristics defined by the feature data; and (e) repeating steps (a)-(d) for each of the objects indentified by the feature data. Notably, one or more "panning" and/or "zooming" operations may need to be performed to obtain a desired view of the area of interest. Such a manual inspection is time consuming, costly and subject to human error.

Additionally, the large amount of video surveillance data collected and maintained today requires increasingly efficient methods for analysis. There are many challenges to the analysis of video which are imposed by its usage as a forensic tool across military applications, law enforcement applications and commercial applications. For example, video analysis is used in unmanned mission applications, critical transportation surveillance applications, energy infrastructure surveillance applications, online geospatial video portal applications, medical applications and industrial production applications. These applications share a common need for efficient analysis of video data which may or may not exist within a geospatial context.

Some traditional approaches for video analysis involve manual video play-back and/or frame-by-frame analysis. One can readily appreciate that techniques employing manual video play-back and frame-by-frame analysis are ad-hoc, time consuming and expensive. Other traditional approaches for video analysis involve comparing the content of two or more video streams. This comparison is achieved by toggling between different video streams or by viewing different video streams that are presented in a side by side manner. Such comparison techniques are time consuming and subject to human error as a result of operator fatigue.

SUMMARY OF THE INVENTION

Embodiments of the present invention concern implementing systems and methods for efficient spatial feature data analysis. The methods involve simultaneously generating a plurality of chip images and a plurality of video chips. The chip images are generated using image data defining at least a first image. The video chips are generated using video data defining at least a first video stream. Thereafter, an array is displayed which comprises a plurality of grid cells in which at least a portion of the chip images is presented, at least a portion of the video chips is presented, or a portion of the chip images and a portion of the video chips are presented. Each of the chip images comprises a panned-only view, a zoomed-only view, or a panned-and-zoomed view of the first image including a visual representation of at least one first object of a particular type (e.g., a building, road, or lake). Each of the video chips comprises a segment of the first video stream which include a visual representation of at least one second object of the same type as the first object. Notably, the first and second objects can be, but is not limited to, the same object which is correlated based on geographic position.

BRIEF DESCRIPTION OF THE DRAWINGS

Embodiments will be described with reference to the following drawing figures, in which like numerals represent like items throughout the figures, and in which:

FIGS. 3A-3G collectively provide a flow diagram of an exemplary method for efficient feature based image and video analysis that is useful for understanding the present invention.

DETAILED DESCRIPTION

Figure 1:
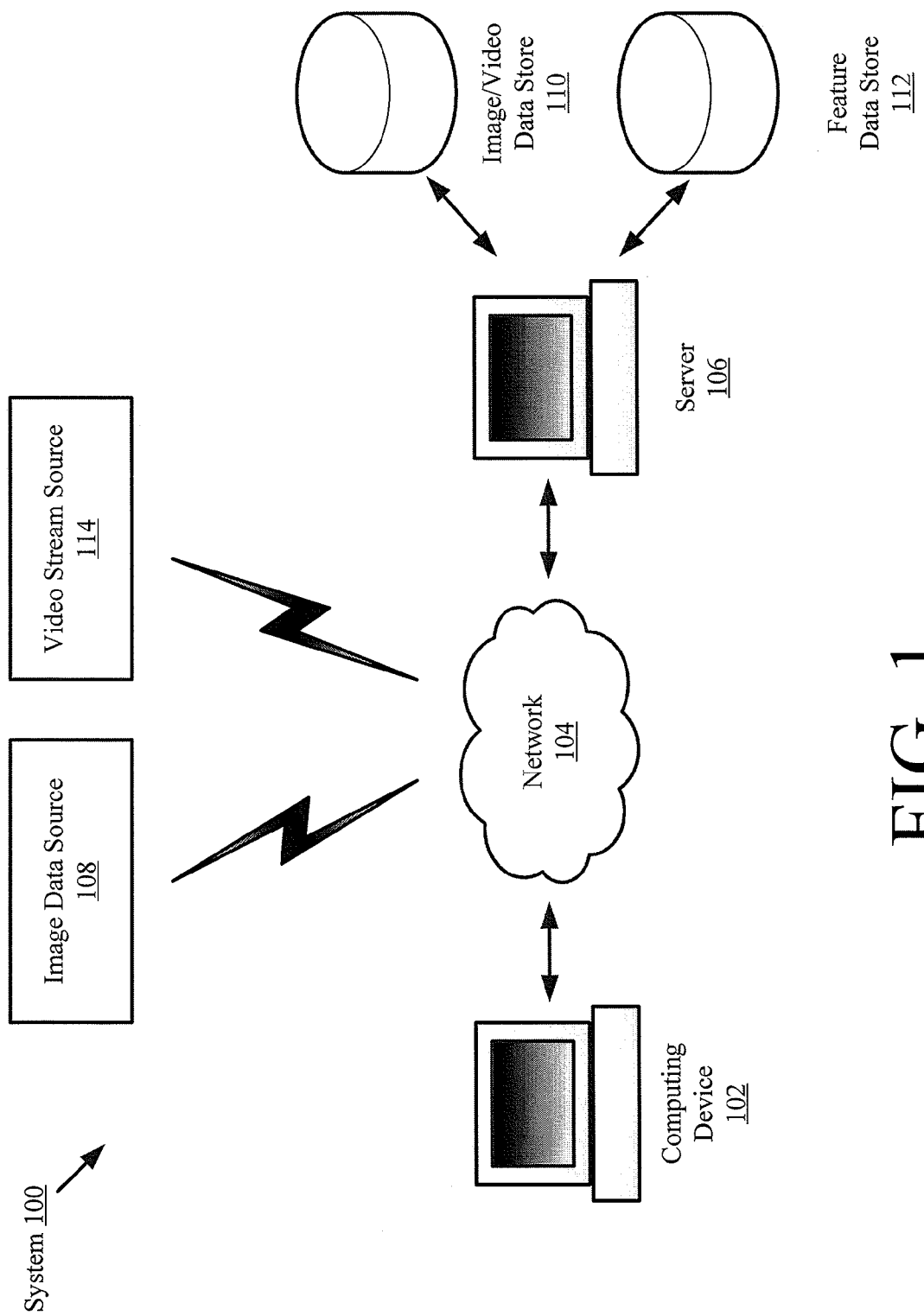
FIG. 1 is a schematic illustration of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for efficient feature based image and video analysis. In this regard, the present invention implements a novel technique for simultaneously or concurrently visually inspecting at least one chip image and at least one video chip. The particularities of the novel technique will become more evident as the discussion progresses. Still, it should be understood that the present invention overcomes various drawbacks of conventional image/video analysis techniques, such as those described above in the background section of this document. For example, the present invention provides more efficient, less time consuming and less costly image/video analysis processes as compared to those of conventional image/video analysis techniques.

The present invention can be used in a variety of applications. Such applications include, but are not limited to, imagery applications, sensor applications, mapping applications, situational awareness applications, natural disaster analysis applications, unmanned vehicle applications, video applications, forensic applications, law enforcement applications, geospatial information based applications, medical applications, military applications, and any other application in which video data needs to be analyzed. Exemplary implementing system embodiments of the present invention will be described below in relation to FIGS. 1-2, 5, 7, 8A and 8B. Exemplary method embodiments of the present invention will be described below in relation to FIGS. 3A-30.

Exemplary Systems Implementing the Present Invention

Referring now to FIG. 1, there is provided a block diagram of an exemplary system 100 that is useful for understanding the present invention. The system 100 comprises a computing device 102, a network 104, a server 106, an image data source 108, a video stream source 114, and at least one data store 110, 112. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate feature data maintenance using an image source and a video stream source for feature display, quality control, and change detection. As such, system 100 implements a method for efficient feature based image and video analysis in accordance with embodiments of the present invention. The method will be described in detail below in relation to FIGS. 3A-30. However, it should be understood that the method implements a data driven approach for enabling an efficient evaluation of geospatial data using imagery data and video data. The phrase "imagery data", as used herein, refers to data defining an image. The phrase "video data", as used herein, refers to data defining a video stream.

The geospatial data, imagery data and video data can be stored in the same or different data stores. For example, as shown in FIG. 1, the geospatial data is stored in a feature data store 112. The imagery data and the video data are stored in a video data store 110. The imagery data may be any type of imagery data. The imagery data can include, but is not limited to, any spatially organized raster data, gridded terrain data, Light Detection And Ranging ("LIDAR") data, Synthetic Aperture Radar ("SAR") data, and/or scanned data. The imagery data is collected by the image data source 108. The image data source 108 can include, but is not limited to, a satellite, an Unmanned Aerial Vehicle ("UAV"), a plane or a vehicle. The video data is collected by the video stream source 114. The video stream source 108 comprises an object comprising a video camera. Such objects include, but are not limited to, a satellite, a UAV, a plane, a vehicle, a building, a tree or a post. Also, the imagery data and the video data can be communicated to the data store 110 via network 104 and server 106.

The computing device 102 facilitates spatial feature data analysis. Accordingly, the computing device 102 has installed thereon a Spatial Feature Analysis ("SFA") software application and at least one feature analysis plug-in. The SFA software application includes, but is not limited to, GeoVideo available from Red Hen Systems, Inc. of Fort Collins, Colo., or RouteScout available from Red Hen Systems, Inc. of Fort Collins, Colo. Each of the listed SFA software applications is well known in the art, and therefore will not be described in detail herein. However, it should be understood that the SFA software applications facilitate the display of images and video streams in an application window. The SFA software applications also facilitate the panning and zooming of displayed images. The SFA software applications further facilitate the fast forwarding and fast reversing of the displayed video streams.

The feature analysis plug-in is a set of software components that adds specific abilities to the SFA software application. For example, the feature analysis plug-in provides the ability to: concurrently and/or simultaneously generate a plurality of chip images using imagery data defining at least one image and video chips using video data defining at least one video stream; and display all or a portion of the generated chip images and/or video chips in a display area of a plug-in window at the same time. The phrase "chip image", as used herein, refers to a panned and/or zoomed view of an image. The phrase "video chip", as used herein, refers to a segment of video in which at least one feature of a feature class has been identified. The segment of video can include, but is not limited to, a spatial-temporal segment of video. The phrase "spatial-temporal segment of video", as used herein, refers to a segment of a video stream which has timing information (e.g., timestamps indicating when images of the segment were captured) and spatial information associated therewith. The timing information includes, but is not limited to, timestamps indicating when images of a video stream are captured. The spatial information includes, but is not limited to, information indicating locations on the Earth which are visually represented by content of images of a video stream (e.g., Global Positioning System information). The feature of the video chip can be used as a "finger print" for purposes of matching, feature change detection, causality identification, feature maintenance and performing other tasks. The feature changes can include, but are not limited to, the addition/destruction of a road, the addition/destruction of a railroad, the addition/destruction of a transmission line, the addition/destruction of a pipeline, and the expansion/destruction of a building. The destruction of a feature can result from a natural disaster, a public disorder, a military operation, a demolition or other cause.

A chip image and a video chip may each include one or more features of interest. The term "feature", as used herein, refers to a representation of an object. Such objects include, but are not limited to, bridges, water towers, boats, planes, roads, lakes, buildings, gas stations, restaurants, malls, stores, vehicles, people, and cisterns. Notably, the chip images and video chips may be displayed in the plug-in window in a grid format or a matrix format. In the grid scenario, each cell of a grid includes one chip image or video chip. As a result of such a grid arrangement of chips, a user can perform feature analysis in a shorter period of time as compared to that needed to perform a feature analysis using the conventional technique employed by the SFA software application. This conventional technique generally involves: (a) manually panning and zooming to each instance of a feature class; and/or (b) manually fast forwarding and/or fast reversing to each instance of a feature class.

Figure 2:
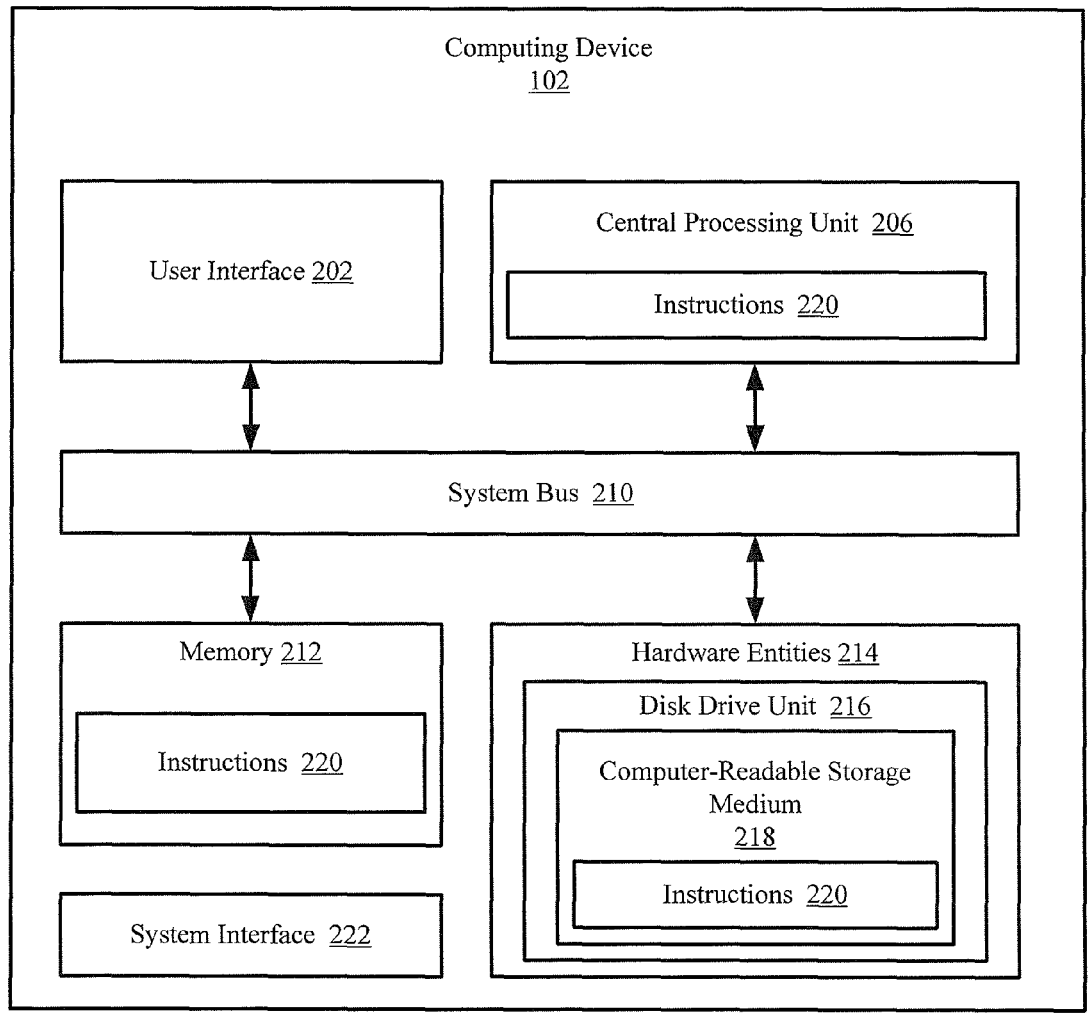
FIG. 2 is a block diagram of an exemplary computing device that is useful for understanding the present invention.

Referring now to FIG. 2, there is provided a block diagram of an exemplary embodiment of the computing device 102. The computing device 102 can include, but is not limited to, a notebook computer, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate feature data analysis in an efficient manner. As such, the computing device 102 of FIG. 2 implements improved methods for feature data analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient feature data analysis. In this regard, it should be understood that the electronic circuit can access and run SFA software applications (not shown in FIG. 2), feature analysis plug-ins (not shown in FIG. 2) and other types of applications installed on the computing device 102. The SFA software applications are generally operative to facilitate the display of images in an application window, the panning of displayed images, the zooming of displayed images, the display of video streams in an application window, the fast forwarding of displayed video streams, and the fast reversing of displayed video streams. The listed functions and other functions implemented by the SFA software applications are well known in the art, and therefore will not be described in detail herein. A schematic illustration of an exemplary application window 504 is provided in FIG. 5.

The feature analysis plug-ins are generally operative to display a plug-in window on a display screen of the computing device 102. A schematic illustration of an exemplary plug-in window 702 is provided in FIG. 7. Various types of information can be presented in the plug-in window. Such information includes, but is not limited to, chip images, video chips and feature attributes. The feature attributes can include, but are not limited to, attributes of an object which a feature visually represents (e.g., heights, lengths, diameters, longitudes, latitudes, addresses, names, text and sales volumes).

The feature analysis plug-ins are also operative to perform one or more of: automatically and simultaneously generating a plurality of chip images and video chips in response to a user-software interaction; generating at least one screen page of chips arranged in a grid or matrix format; displaying screen pages of chips in a plug-in window; and simultaneously or concurrently playing a plurality of video chips of a displayed screen page of chips. The term "to play", as used herein, means the reproduction of a segment of a video recording after it has been made by sequentially displaying images in an image sequence.

The feature analysis plug-ins are further operative to perform one or more of: updating a view of an image displayed in an application window to show at least the feature of a selected one of a plurality of chips displayed in a plug-in window; fast forwarding and/or fast reversing a video stream displayed in an application window until the segment of the video stream comprising the feature of a selected chip of a plug-in window is displayed in an application window; displaying at least one attribute of a selected chip in a plug-in window; sorting chip images and video chips based on at least one feature attribute; automatically generating and displaying at least one screen page of chips which are arranged in a sorted order; simultaneously or concurrently playing video chips of a screen page of sorted chips; filtering chip images and video chips based on at least one feature attribute; randomly selecting and displaying only a percentage of a plurality of chip images and/or a plurality of video chips; changing a grid size in response to a user-software interaction; changing a zoom level of resolution of displayed chip images and/or displayed video chips in response to a user-software interaction; cycling through screen pages of chip images, a plurality of screen pages of video chips, and/or a plurality of screen pages of chip images and video chips; marking chip images and video chips in response to user software-interactions; unmarking chip images and video chips in response to user-software interactions; and remembering various settings that a user sets for each feature class (e.g., bridges, water towers and gas stations) during at least one session. The listed functions and other functions of the feature analysis plug-ins will become more apparent as the discussion progresses. Notably, one or more of the functions of the feature analysis plug-ins can be accessed via a toolbar, menus and other GUI elements of the plug-in window.

A schematic illustration of an exemplary toolbar 704 of a plug-in window (e.g., plug-in window 702 of FIG. 7) is provided in FIG. 8A. As shown in FIG. 8A, the toolbar 704 comprises a plurality of exemplary GUI widgets 802-830. Each of the GUI widgets 802-830 is shown in FIG. 8A as a particular type of GUI widget. For example, GUI widget 802 is shown as a drop down menu. Embodiments of the present invention are not limited in this regard. The GUI widgets 802-830 can be of any type selected in accordance with a particular application.

GUI widget 802 is provided to facilitate the display of an array of chips including features of a user selected feature class (e.g., chimney/smokestack, gas station, restaurant, lake, road, water tower, and building). The array of chips is displayed in the display area (e.g., display area 706 of FIG. 7) of the plug-in window (e.g., plug-in window 702 of FIG. 7) in a grid format. In the embodiment shown in FIG. 8A, the GUI widget 802 includes, but is not limited to, a drop down list that is populated with the feature classes identified in a previously generated feature list. Drop down lists are well known in the art, and therefore will not be described herein.

GUI widget 804 is provided to facilitate moving through screen pages of chips associated with a single feature class. If a selected feature class has more than the maximum number of features that can fit in a grid of a selected grid size (e.g., three cells by three cells), then the feature analysis plug-in generates a plurality of screen pages of chips. Each screen page of chips includes a grid with chips (e.g., chip images and/or video chips) contained in the cells thereof. As shown in the embodiment of FIG. 8A, the GUI widget 804 includes, but is not limited to, a text box, a forward arrow button and a backward arrow button. Text boxes and arrow buttons are well known in the art, and therefore will not be described herein. This configuration of the GUI widget 804 allows a user to move forward and backward through the screen pages of chips. Paging forward or backward will cause the chip in an upper left corner grid cell of the new screen page to be selected. The screen page context is displayed in the text box as the numerical range of chips displayed (e.g., chips one through nine) and the total number of chips (e.g., twenty) providing visual representations of features of a selected feature class.

GUI widget 806 is provided to facilitate jumping to a desired screen page of chips for review. As shown in the embodiment of FIG. 8A, GUI widget 806 includes, but is not limited to, a text box and a search button. The text box is a box in which to enter a screen page number (e.g., three). Clicking the search button will cause the screen page of chips having the entered screen page number to be displayed in the display area (e.g., display area 706 of FIG. 7) of the plug-in window (e.g., plug-in window 702 of FIG. 7). The screen pages of chips can include, but are not limited to, screen pages comprising only chip images, screen pages comprising only video chips, and screen pages comprising both chip images and video chips.

GUI widget 808 is provided to facilitate a selection of a grid size from a plurality of pre-defined grid sizes. As shown in FIG. 8A, the GUI widget 808 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four chips will be simultaneously or concurrently displayed in the display area of the plug-in window. The grid size of three cells by three cells ensures that a maximum of nine chips will be simultaneously or concurrently displayed in the display area of the plug-in window. The grid size of four cells by four cells ensures that a maximum of sixteen chips will be simultaneously or concurrently displayed in the display area of the plug-in window. The grid size of five cells by five cells ensures that a maximum of twenty-five chips will be simultaneously or concurrently displayed in the display area of the plug-in window. The grid size of six cells by six cells ensures that a maximum of thirty-six chips will be simultaneously or concurrently displayed in the display area of the plug-in window. The grid size of seven cells by seven cells ensures that a maximum of forty-nine chips will be simultaneously or concurrently displayed in the display area of the plug-in window. The grid size of eight cells by eight cells ensures that a maximum of sixty-four chips will be simultaneously or concurrently displayed in the display area of the plug-in window. The grid size of nine cells by nine cells ensures that a maximum of eight-one chips will be simultaneously or concurrently displayed in the display area of the plug-in window. The grid size of ten cells by ten cells ensures that a maximum of one hundred chips will be simultaneously or concurrently displayed in the display area of the plug-in window. Embodiments of the present invention are not limited to grids having an equal number of cells in the rows and columns thereof. For example, a grid can alternatively have a grid size of four cells by three cells such that each column thereof comprises four cells and each row thereof comprises three cells, or vice versa.

Notably, the display area for each chip is different for each grid size. For example, the display area for each chip in a grid having a grid size of two cells by two cells is larger than the display area for each chip in a grid having a grid size of three cells by three cells. Also, if each chip has the same zoom level of scale or resolution, then the portion of a data source (e.g., image or data stream) contained in a chip displayed in a two cell by two cell grid is larger than the portion of a data source contained in a chip displayed in a three cell by three cell grid. It should also be noted that, in some embodiments, a selected chip of a first grid will reside in an upper left corner cell of a second grid having an enlarged or reduced grid size.

GUI widget 812 is provided to facilitate a selection of features for display in the display area (e.g., display area 706 of FIG. 7) of the plug-in window (e.g., plug-in window 702 of FIG. 7) based on their attributes. As shown in FIG. 8A, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< >'100 Feet'], ["HEIGHT" IS NULL], ["HEIGHT" IS NOT NULL], ["HEIGHT">'100 Feet' AND "DIAMETER">'40 Feet'], or ["HEIGHT"<'100 Feet' OR "DIAMETER">'40 Feet']). A schematic illustration of an exemplary drop-down box 850 is provided in FIG. 8B. When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., bridges) to a second feature class (e.g., water towers) during a session, then the previously set filter query for the second feature class will be restored. Consequently, only features of the second feature class (e.g., water towers) which have the attribute specified in the previously set filter query (e.g., "HEIGHT"='100 Feet') will be displayed in the plug-in window.

GUI widget 814 is provided to facilitate the sorting of chip images and/or video chips based on one or more attributes of the features contained therein. For example, a plurality of chips are sorted into an ascending or descending order based on the heights and/or diameters of the water towers visually represented by the features contained therein. As shown in FIG. 8A, the GUI widget 814 includes a drop down list. Embodiments of the present invention are not limited in this regard. For example, the GUI widget 814 can alternatively include a button and a drop down arrow for accessing a drop down box. The button facilitates the enablement and disablement of a sorting function of the feature analysis plug-in. The drop down box allows a user to define settings for sorting chip images and/or video chips based on one or more attributes of an active feature class. As such, the drop down box may include a list from which an attribute can be selected from a plurality of attributes. The drop down box may also include widgets for specifying whether the chip images and/or video chips should be sorted in an ascending order or a descending order.

Notably, the feature analysis plug-in remembers the sort settings that a user defines for each feature class during a session. Accordingly, if the user changes a feature class from a first feature class (e.g., bridges) to a second feature class (e.g., water towers) during a session, then the previously defined sort settings for the second feature class will be restored. Consequently, chip images and/or video chips containing features of the second feature class (e.g., water towers) will be displayed in a sorted order in accordance with the previously defined sort settings.

GUI widget 820 is provided to facilitate the display of a random sample of chip images and/or video chips of features of a particular feature class for visual inspection and quality control testing. As such, the GUI widget 820 includes, but is not limited to, a button for enabling/disabling a random sampling function of the feature analysis plug-in and a drop down menu from which a percentage value can be selected.

GUI widget 822 is provided to facilitate the filtering of features which lie outside of an area (e.g., a geographic area) defined either by the area of a plurality of images and/or a plurality of video streams have in common or by the area covered by a plurality of images or video streams taken together. As such, the GUI widget 822 includes, but is not limited to, a button for enabling and disabling an intersection function of the feature analysis plug-in.

GUI widget 810 is provided to facilitate the selection of one or more data sources from a plurality of data sources. The data sources include, but are not limited to, images and video streams. As shown in FIG. 8A, the GUI widget 810 includes, but is not limited to, a text box and a drop down list populated with the names of data sources. If a user selects one or more new items from the drop down list, then the feature analysis plug-in generates and displays at least one screen page of chips using the data source(s) indentified by the newly selected item(s). The chips contain features of the same feature class as the immediately preceding displayed chips. The text box displays information identifying the data source(s) from which the currently displayed chips were generated. The contents of the text box can be updated in response to a user selection of a new item from the drop down list. The contents of the text box can also be updated by the feature analysis plug-in during the performance of data source cycling operations, which will be described below in relation to GUI widget 824. Accordingly, the information contained in the text box always identifies the data source(s) from which the currently displayed chips were generated.

GUI widget 824 is provided to facilitate the cycling through screen pages for a plurality of images and/or screen pages for a plurality of video streams. A user may want to cycle through such screen pages for change detection purposes. The GUI widget 824 is configured to allow manual cycling and/or automatic cycling between screen pages for a plurality of images and/or screen pages for a plurality of video streams. As such, the GUI widget 824 includes, but is not limited to, a check box for enabling and disabling cycling operations of the feature analysis plug-in, a slider for setting the rate at which the data sources automatically cycle, and/or a button for manually commanding when to change the data source.

GUI widget 826 is provided to facilitate the performance of manual scale operations by the feature analysis plug-in. The manual scale operations are operative to adjust the spatial zoom level of scale of images of all of the displayed chips from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget 826 includes, but is not limited to, a drop down list populated with a plurality of whole number percentage values. The percentage values include, but are not limited to, whole number values between zero and one hundred.

GUI widget 828 is provided to facilitate the viewing of each displayed feature at its best-fit zoom level of scale or its pre-defined maximum zoom level of scale. As such, the GUI widget 828 includes, but is not limited to, a button for enabling and disabling auto-scale operations of the feature analysis plug-in. When the auto-scale operations are enabled, the manual-scale operations are disabled. Similarly, when the auto-scale operations are disabled, the manual-scale operations are enabled.

GUI widget 816 is provided to facilitate the writing of all "flagged" chips to an output file stored in a specified data store (e.g., feature data store 112 of FIG. 1). GUI widget 818 is provided to facilitate the saving of all chips which have been "flagged" during a session to a user-named file. The user-named file can include, but is not limited to, a shapefile. Shapefiles are well known in the art, and therefore will not be described herein. In some embodiments of the present invention, a chip is "flagged" by right clicking on the chip to obtain access to a "chip context" GUI and selecting a "flag" item from the "chip context" GUI.

GUI widget 830 is provided to facilitate the viewing of a plurality of "temporally zoomed" video chips using a feature analysis plug-in. In this regard, it should be understood that temporal resolution operations are initiated via GUI widget 830. The temporal resolution operations involve modifying a temporal level of resolution of at least one video chip. The temporal resolution is modified by (a) altering the temporal resolution of video chips which precede a selected video chip in a temporal order, (b) altering the temporal resolutions of video chips which succeed the selected video chips in the temporal order, or (c) altering the temporal resolution of only the selected video chip. For example, in scenario (c), a selected video chip has an original temporal level of resolution of one minute. In response to a user-software interaction, the temporal level of resolution of the selected video chip is changed to ten seconds. Consequently, the content of the selected video chip is re-displayed in a plug-in window as six, ten second video chips, rather than one sixty second video chip. Embodiments of the present invention are not limited to the particularities of the above-provided example. The temporal level of scale can be increased and/or decreased via GUI widget 830. As shown in FIG. 8A, the GUI widget 830 includes, but is not limited to, a button for enabling and disabling temporal resolution operations of the feature analysis plug-in. The GUI widget 830 may also comprise a means (not shown) for selecting a new value (e.g., ten seconds) for the temporal level of resolution (e.g., a text box and a drop down list).

As evident from the above discussion, the system 100 implements one or more method embodiments of the present invention. The method embodiments of the present invention provide implementing systems with certain advantages over conventional image/video analysis systems. For example, the present invention provides a system in which an analysis of image/video data can be performed in a shorter period of time as compared to the amount of time needed to analyze image/video data using conventional panning/zooming techniques and conventional fast forward/fast reverse techniques. The present invention also provides a system in which image/video data is analyzed much more efficiently than in conventional image/video data analysis systems. The manner in which the above listed advantages of the present invention are achieved will become more evident as the discussion progresses.

Exemplary Methods of the Present Invention

Figure 3A:
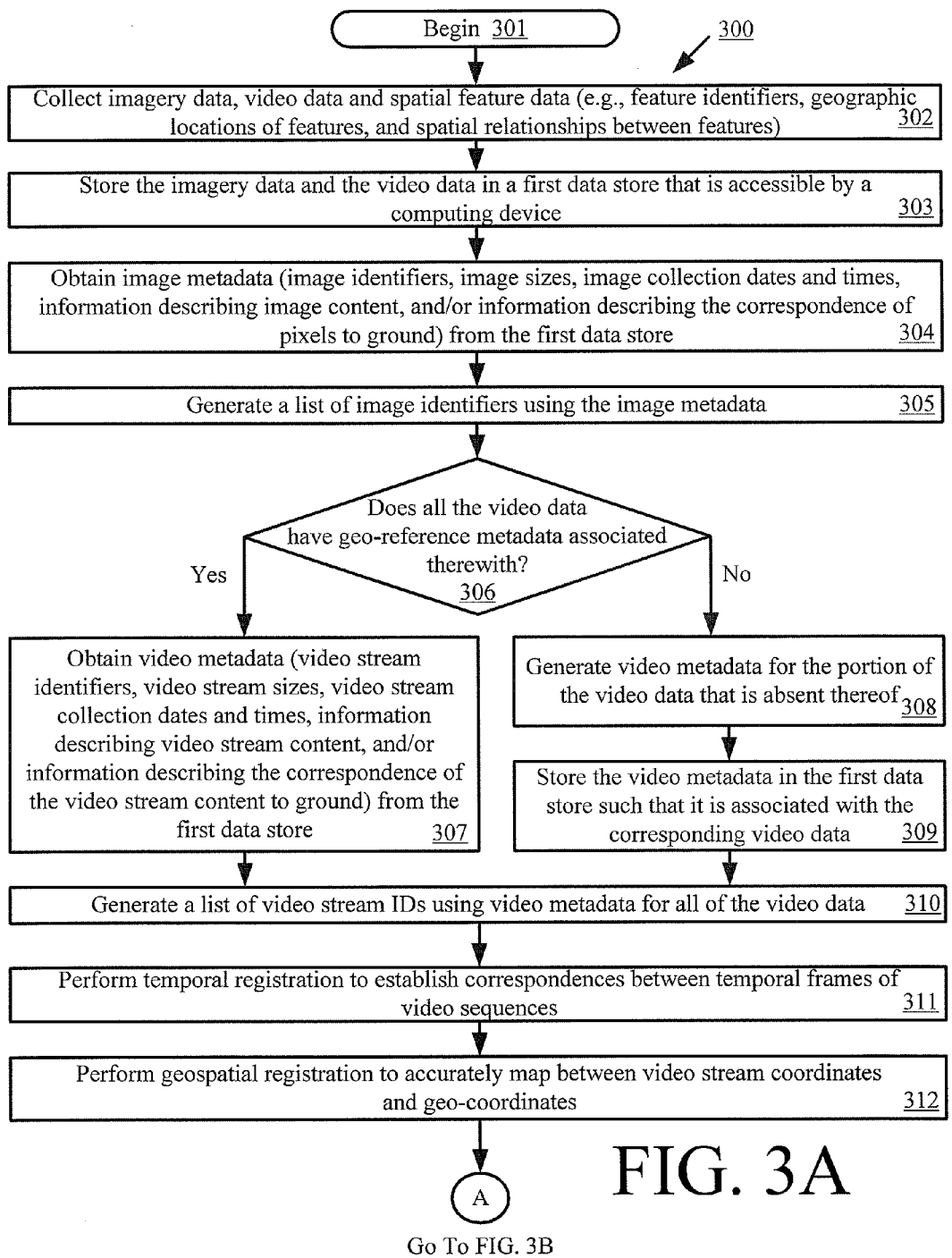

Referring now to FIGS. 3A-3G, there is provided a flow diagram of an exemplary method 300 for efficient imagery data and video data analysis that is useful for understanding the present invention. As shown in FIG. 3A, the method 300 begins with step 301 and continues with step 302. In step 302, imagery data, video data and spatial feature data is collected. The spatial feature data can include, but is not limited to, data defining feature identifiers, geographic locations of features, and spatial relationships between the features.

After the imagery data and the video data is collected, it is stored in a first data store (e.g., video data store 110 of FIG. 1) that is accessible by a computing device (e.g., computing device 102 of FIG. 1), as shown by step 303. In a next step 304, image metadata is obtained from the first data store. The image metadata includes, but is not limited to, data defining image identifiers, data defining image sizes, data defining image collection dates and times, data describing image content, and/or information describing the correspondence of pixels to ground. The image metadata is then used in step 305 to generate a list of image identifiers. The list of image identifiers will be used subsequently by a feature analysis plug-in to allow a user to select at least one of a plurality of images to analyze at any given time.

Subsequent to generating the list of image identifiers, a decision step 306 is performed for determining if all of the video data has geo-referenced metadata associated therewith. The geo-referenced metadata includes, but is not limited to, data that describes the correspondence of the contents of a video stream to ground (e.g., GPS data). If all of the video data does have geo-referenced metadata associated therewith [306:YES], then step 307 is performed where video metadata is obtained from the first data store. The video metadata includes, but is not limited to, data defining video stream identifiers, video stream sizes, video stream collection dates and times, video stream content, and/or the correspondence of video stream content to ground. Upon completion of step 307, the method 300 continues with step 310, which will be described below.

If all of the video data does not have geo-referenced metadata associated therewith [306: NO], then step 308 is performed where video metadata is generated for the portion of the video data that is absent of associated geo-referenced metadata. The generated video metadata is then stored in the first data store such that it is associated with the corresponding video data, as shown by step 309. In a next step 310, the video metadata is used to generate a list of video stream identifiers. The list of video stream identifiers will be used subsequently by a feature analysis plug-in to allow a user to select at least one of a plurality of video streams to analyze at any given time.

The video data, video metadata and/or spatial feature data is used in steps 311 and 312 for temporal registration and geospatial registration of the video streams. Methods for temporal registration and geospatial registration are well known in the art, and therefore will not be described herein. However, it should be understood that temporal registration is generally performed to establish correspondences between temporal frames of video sequences. Geospatial registration is generally performed to accurately map between video stream coordinates and geo-coordinates. Any known method for temporal registration and geospatial registration of video streams can be used with the present invention without limitation. Notably, such known techniques may employ place/name databases, GOOGLE® maps, and/or Global Positioning System ("GPS") information.

Figure 3B:
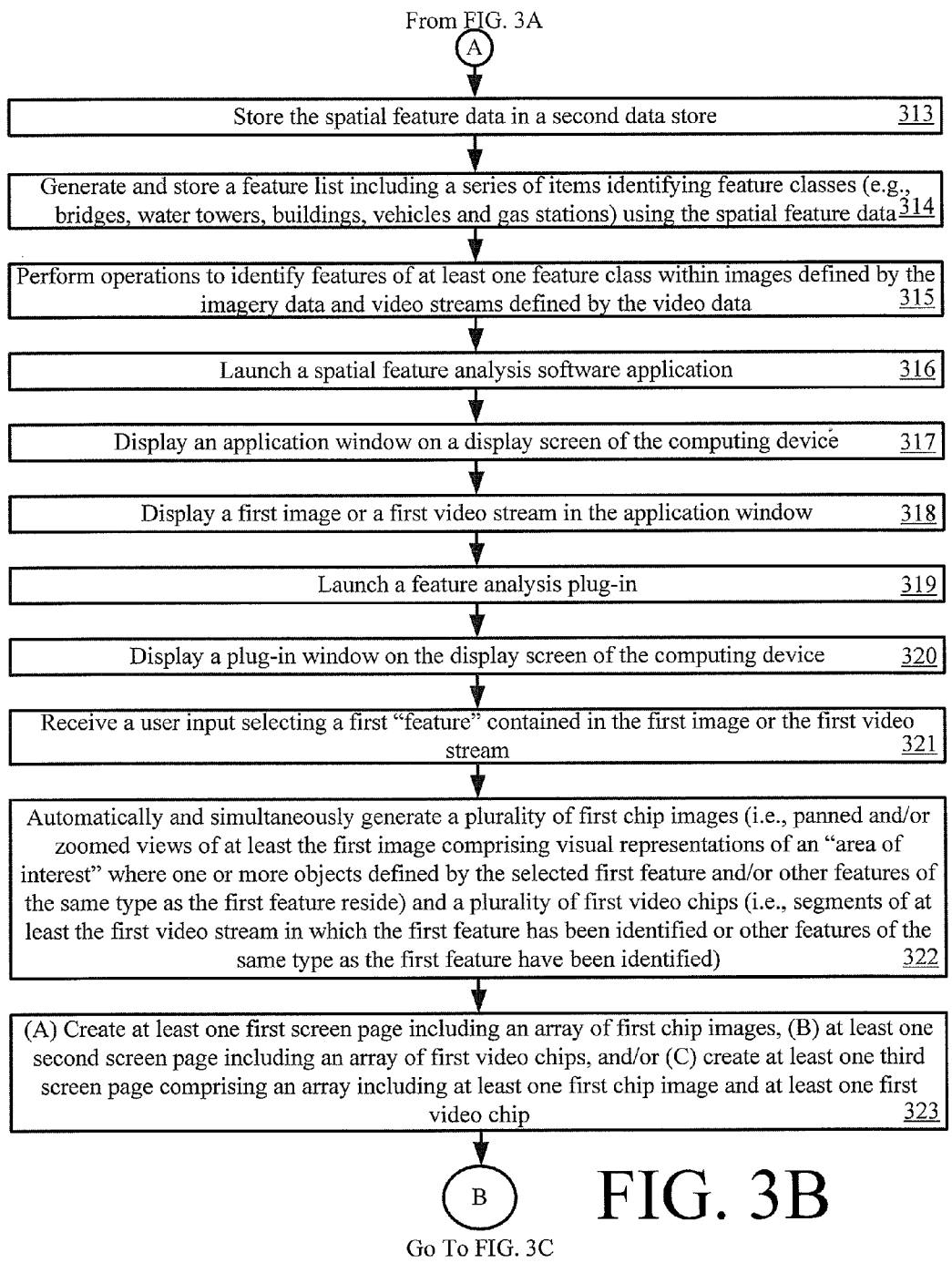

Similar to the imagery data and video data, the spatial feature data is stored in a data store (e.g., feature data store 112 of FIG. 1) after it is collected, as shown by step 313 of FIG. 3B. The spatial feature data is used in step 314 of FIG. 3B to generate a feature list including a series of items identifying feature classes (e.g., bridges, water towers, buildings, vehicles and gas stations). Subsequently, the feature list is stored in the data store (e.g., data store 112 of FIG. 1).

Upon completing step 314, the method continues with step 315 where a computing device (e.g., server 106 of FIG. 1) performs operations to identify features of at least one feature class within images defined by the imagery data and within video streams defined by the video data. As should be understood, the features can be identified using geo-referenced metadata and the spatial feature data. For example, if the geo-referenced metadata includes first GPS data and the spatial feature data includes second GPS data, then the first GPS data is compared to the second GPS data to determine matches thereof. When a match is found, it is determined that a feature associated with the "matching" second GPS data is contained in the image or video stream associated with the geo-referenced metadata. Embodiments of the present invention are not limited in this regard.

Figure 4:
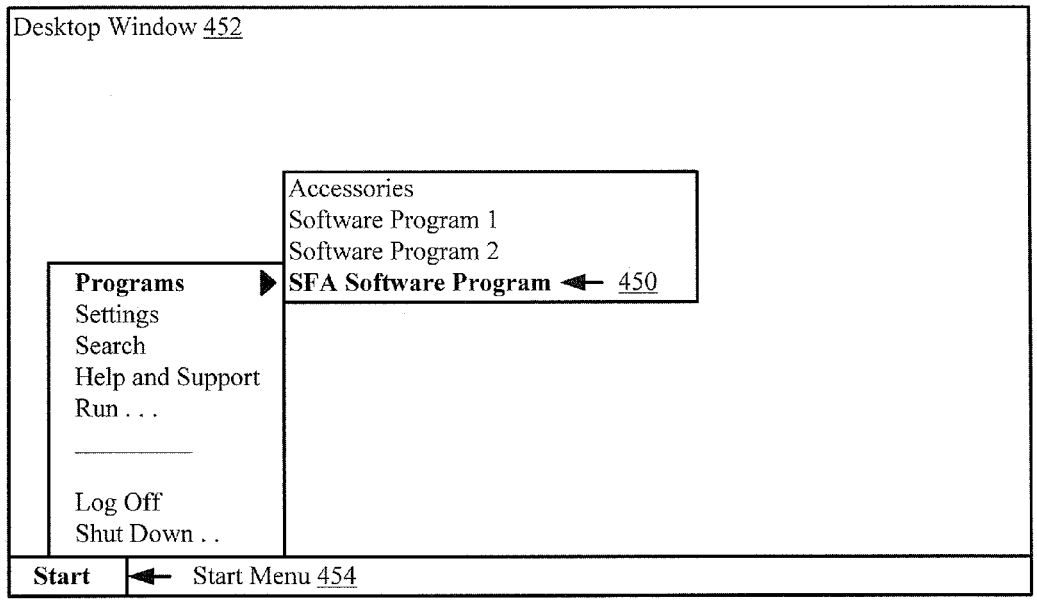
FIG. 4 is a schematic illustration of an exemplary desktop window that is useful for understanding the present invention.

In a next step 316, an SFA software application is launched. The SFA software application can be launched in response to a user software interaction. For example, as shown in FIG. 4, an SFA software application can be launched by accessing and selecting an "SFA Software Program" entry 450 on a start menu 454 of a desktop window 452.

Figure 5:
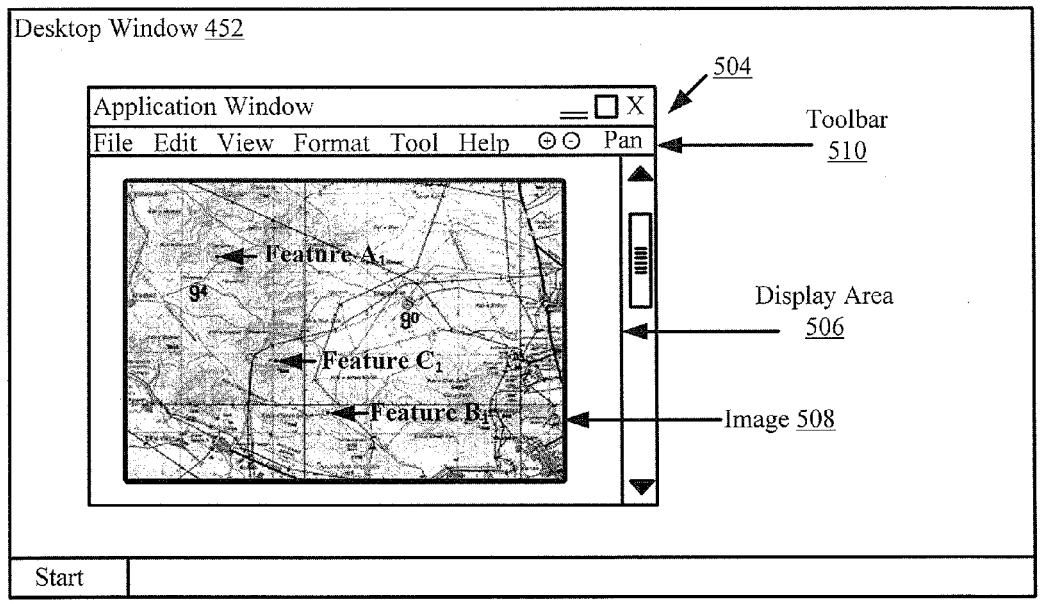
FIG. 5 is a schematic illustration of an exemplary application window that is useful for understanding the present invention.

In a next step 317, an application window is displayed on top of the desktop window. A schematic illustration of an exemplary application window is provided in FIG. 5. As shown in FIG. 5, the application window 504 includes a toolbar 510 including GUI widgets for at least displaying an image, panning an image, zooming an image, and launching a plug-in. The toolbar 510 may also include GUI widgets (not shown) for displaying a video stream, fast reversing a video stream, playing a video stream, pausing a video stream, and fast forwarding a video. The application window 504 also includes a display area 506 in which an image or a video stream can be presented to a user of the computing device (e.g., computing device 102 of FIG. 1).

Referring again to FIG. 3B, a first image or a first video stream is displayed in the application window, as shown in step 318. A schematic illustration showing an exemplary first image 508 displayed in an application window 504 is provided in FIG. 5. The first image 508 contains data relating to the existence of at least one feature of interest $A_1$ (e.g., a road), $B_1$ (e.g., a building) and $C_1$ (e.g., a cistern). Embodiments of the present invention are not limited in this regard.

Figure 6:
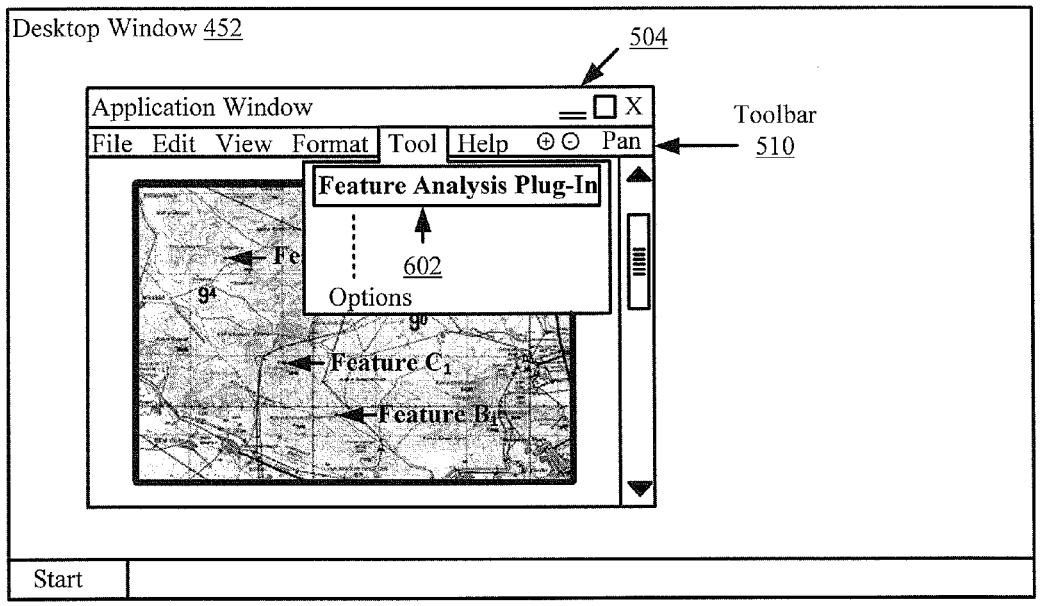
FIG. 6 is a schematic illustration of an exemplary drop down menu of an application window that is useful for understanding the present invention.
Figure 7:
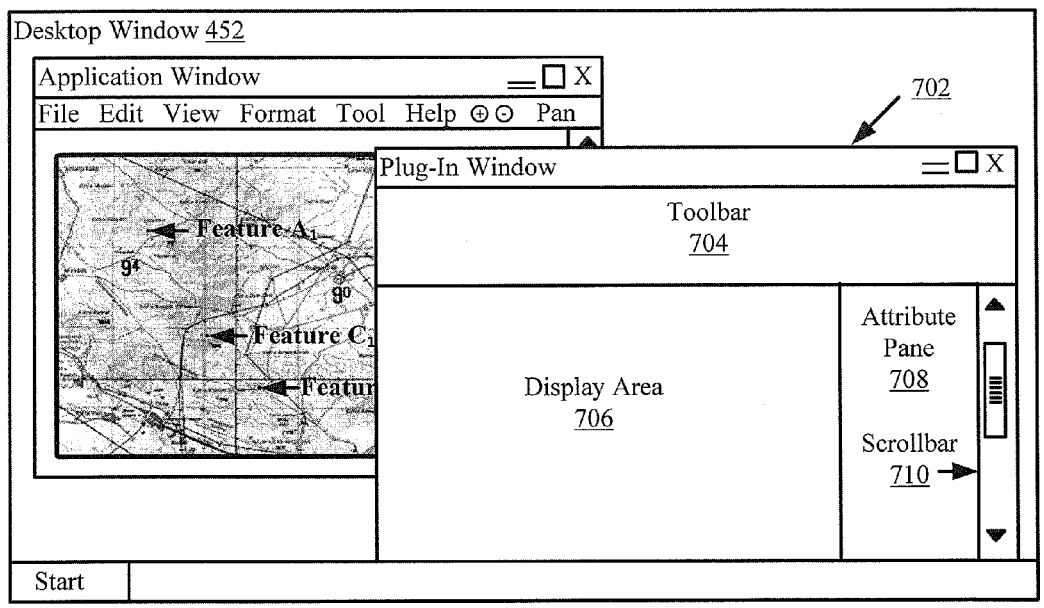
FIG. 7 is a schematic illustration of an exemplary plug-in window that is useful for understanding the present invention.
Figure 8:
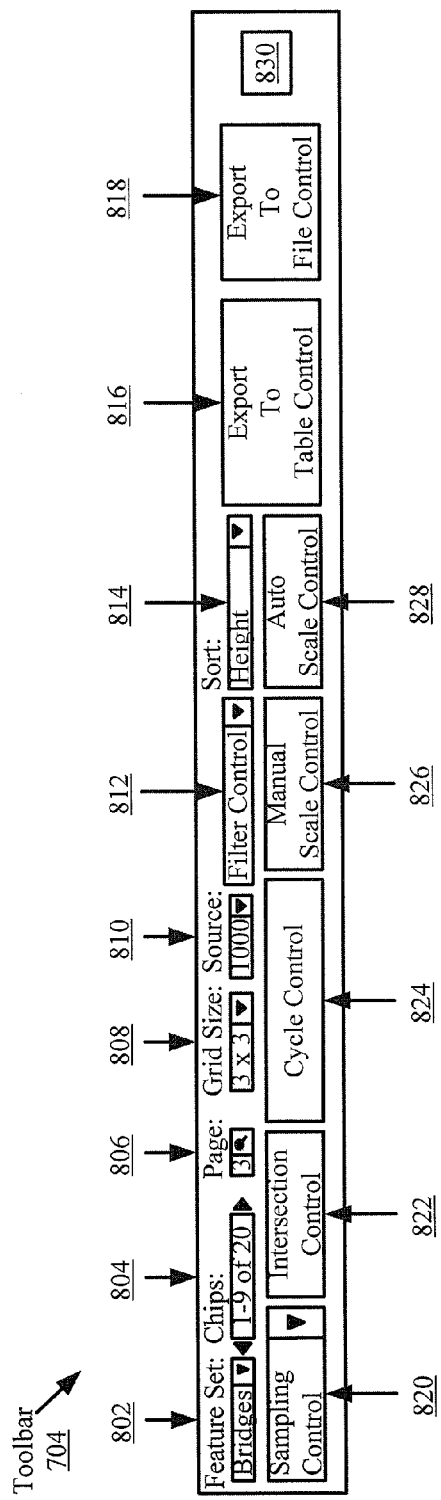
FIG. 8A is a schematic illustration of an exemplary toolbar of a plug-in window that is useful for understanding the present invention.
FIG. 8B is a schematic illustration of an exemplary drop down menu that is useful for understanding the present invention.

After the first image or first video stream is presented to a user of the computing device (e.g., computing device 102 of FIG. 1), a feature analysis plug-in is launched, as shown by step 319. The feature analysis plug-in can be launched in response to a user-software interaction. For example, as shown in FIG. 6, a feature analysis plug-in is launched by selecting an item 602 of a drop down menu of a toolbar 510 of an application window 504. Once the feature analysis plug-in is launched, the method 300 continues with step 320 where a plug-in window is displayed on top of the desktop window and/or application window. A schematic illustration of an exemplary plug-in window 702 is provided in FIG. 7. As shown in FIG. 7, the plug-in window 702 comprises a toolbar 704, a display area 706, an attribute pane 708, and a scrollbar 710. A schematic illustration of the toolbar 704 is provided in FIG. 8A. As shown in FIG. 8A, the toolbar 704 comprises a plurality of exemplary GUI widgets 802-828. Each of the GUI widgets 802-828 is described above in detail.

Figure 9:
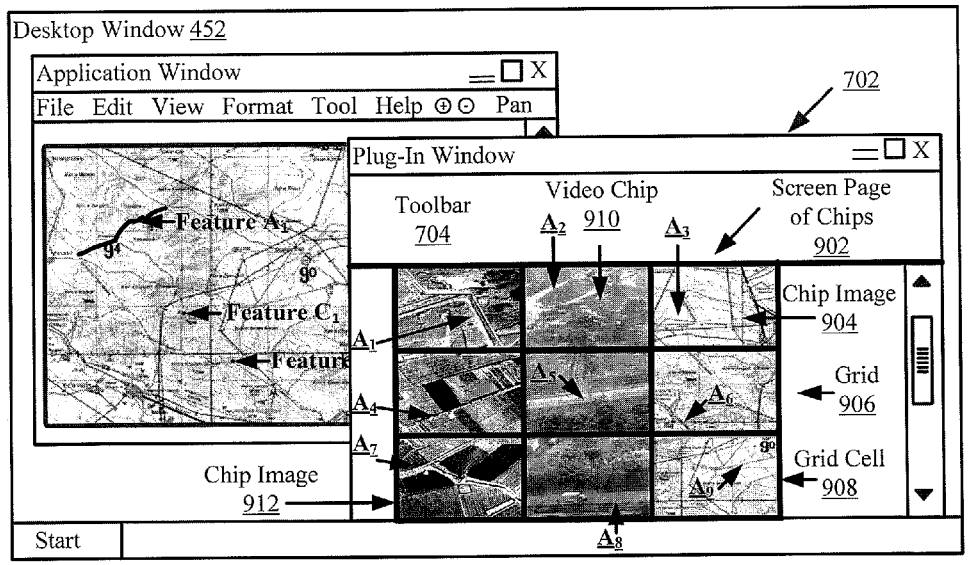
FIG. 9 is a schematic illustration of an exemplary screen page of chip images and video chips that is useful for understanding the present invention.

Referring again to FIG. 3B, a next step 321 is performed where a user input is received by the computing device (e.g., computing device 102 of FIG. 1). The user input selects a first "feature" contained in the first image or the first video stream displayed in the application window. The first "feature" can be selected by moving a mouse cursor over the "feature" and clicking a mouse button. A schematic illustration of a selected "feature" $A_1$ is provided in FIG. 9. As shown in FIG. 9, the selected "feature" $A_1$ is annotated with a relatively thick and distinctly colored line. Embodiments of the present invention are not limited in this regard. Any type of mark or annotation can be used to illustrate that a particular "feature" has been selected.

In response to the user-software interaction of step 321, step 322 is performed where the feature analysis plug-in automatically and concurrently generates a plurality of first chip images and a plurality of first video chips. The first chip images are generated using the feature list generated in previous step 314, the spatial feature data for the features which are of the same type as the first feature selected in previous step 321, and/or the imagery data for at least one image. The first chip images include panned and/or zoomed views of at least one image which present visual representations of an "area of interest" where one or more objects defined by the selected first feature (e.g., feature $A_1$ of FIG. 9) and/or other features (e.g., features $A_1, A_3, A_4, A_6, A_7, A_9$ of FIG. 9) of the same type (e.g., a road) as the first feature reside. The first chip images can have a default zoom level of scale or resolution.

The "area of interest" can be a pre-defined area of interest (e.g., Florida) or a user-specified area of interest (e.g., West Palm Beach, Fla.). The user can specify the "area of interest" by selecting an item from a list or by selecting a portion of the first image or first video stream displayed in the application window. The first video chips are generated using the feature list generated in previous step 314, the spatial feature data for the features which are of the first feature selected in previous step 321, the video metadata and/or the video data for at least one video stream. Each of the first video chips includes a segment of a video stream which comprises at least one previously identified feature (e.g., features $A_2, A_5, A_9$ of FIG. 9). Notably, the object represented by a feature of at least one video chip may be the same object as that represented by a feature of at least one of the chip images. Alternatively, the object represented by a feature of at least one video chip may be a different object than that represented by a feature of at least one of the chip images. The identified feature may be used as a "finger print" for purposes of matching, change detection, causality identification, feature maintenance and performing other tasks. The first video chips can have a default duration (e.g., thirty seconds, one minute, or two plus minutes) and/or a default zoom level of scale or resolution.

Figure 10:
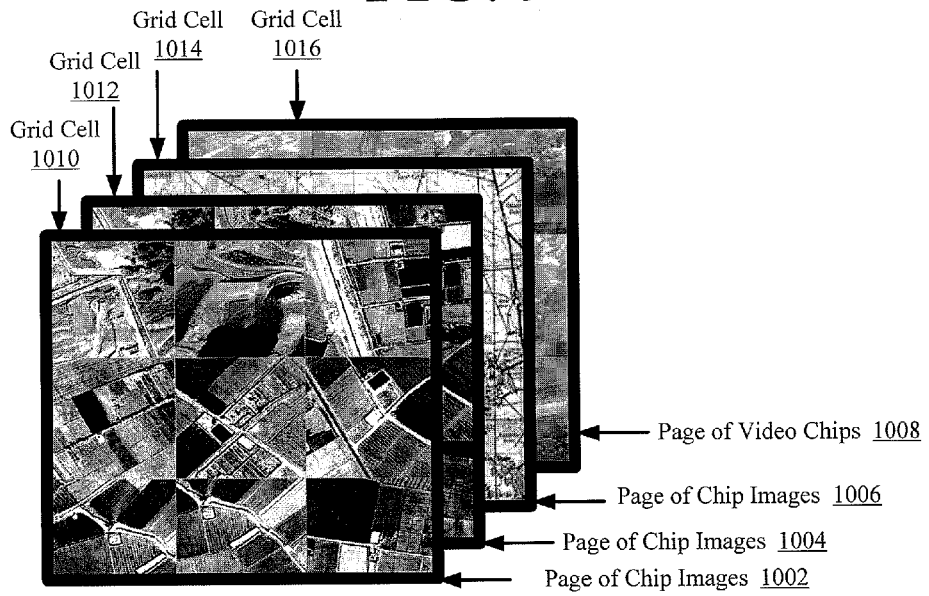
FIG. 10 is a schematic illustration of exemplary screen pages of chip images and an exemplary screen page of video chips that is useful for understanding the present invention.

Upon completing step 322, step 323 is performed where at least one screen page is created. The screen page comprises: a first screen page including an array of first chip images (e.g., screen page 1002, 1004, or 1006 of FIG. 10); a second screen page including an array of first video chip (e.g., screen page 1008 of FIG. 10); or a third screen page including an array comprising at least one first chip image and at least one first video chip (e.g., screen page 902 of FIG. 9). The chips of each array are arranged on the page in a grid or matrix format. The grid or matrix of the chips has a default size (e.g., ten cells by ten cells) or a user-specified size (e.g., three cells by three cells). Notably, if more than one screen page is created in step 323, then the screen pages can be of the same type or of different types. For example, the screen pages can include multiple first screen pages, multiple second screen pages, or multiple third screen pages. Alternatively, the screen pages can include at least one first screen page and at least one second screen page, as shown in FIG. 10. Embodiments are not limited in this regard.

In some embodiments of the present invention, corresponding cells of the first screen page(s) and/or the second page(s) can include visual representations of the same feature. For example, as shown in FIG. 10, grid cell 1010 of screen page 1002 comprises a chip image of a particular road. Similarly, grid cells 1012, 1014 of screen pages 1004, 1006 each comprise a chip image of the same road as that shown in grid cell 1010. Likewise, grid cell 1016 of screen page 1008 comprises a video chip of the same road as that shown in grid cells 1010, 1012, 1014. Embodiments of the present invention are not limited in this regard.

In other embodiments of the present invention, the third screen page(s) can include visual representations of a plurality of different features of the same type. For example, as shown in FIG. 9, each row of the screen page 902 comprises at least one chip image and/or at least one video chip including visual representations of the same object (e.g., a single road corresponding to all of the chip features $A_1/A_2/A_3$, $A_4/A_5/A_6$, or $A_7/A_8/A_9$). However, the rows include chips comprising visual representations of different objects of the same type (e.g., different roads each corresponding to a respective one of chip feature sets $A_1/A_2/A_3$, $A_4/A_5/A_6$, and $A_7/A_8/A_9$). Embodiments of the present invention are not limited in this regard.

Figure 3C:
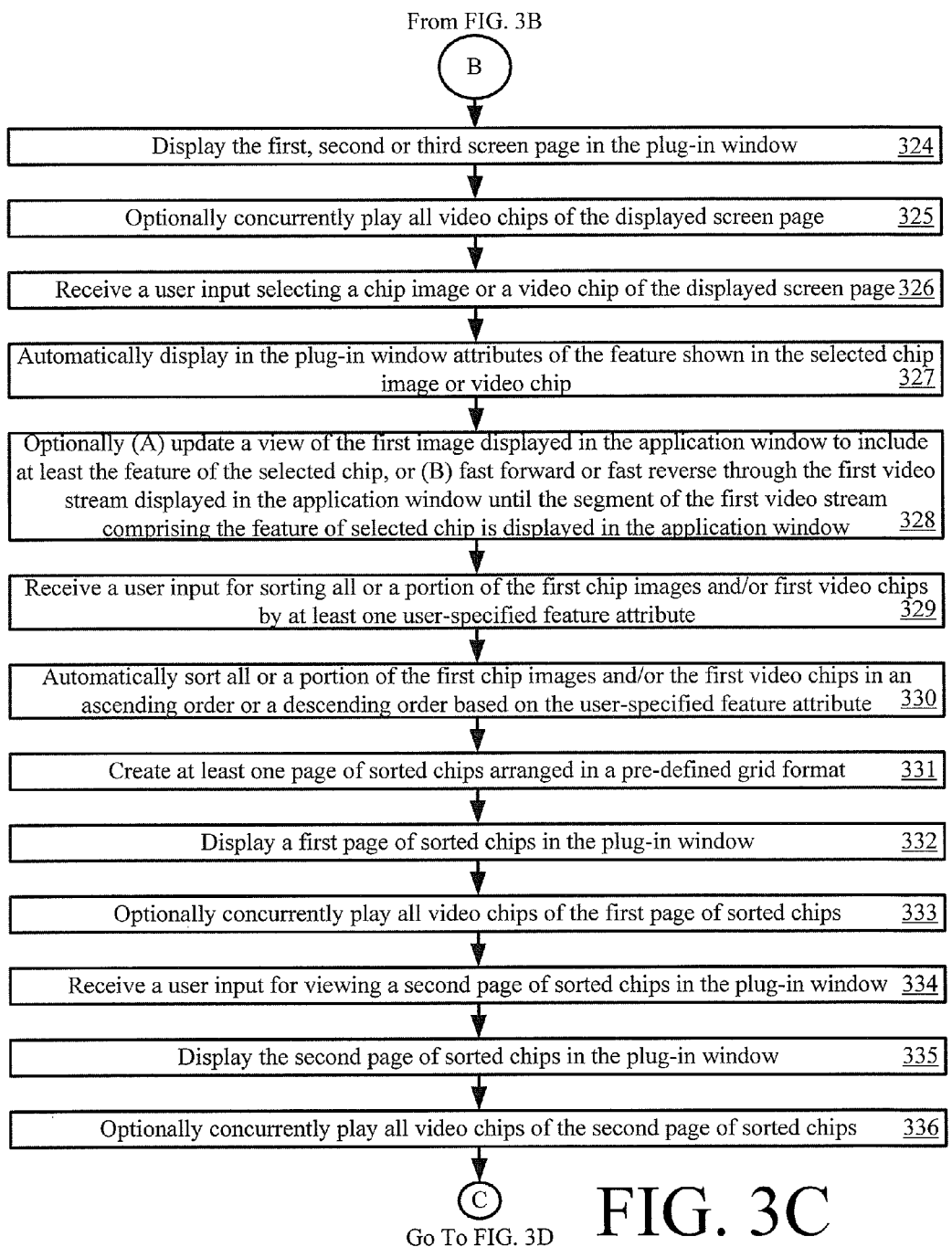
Figure 3E:
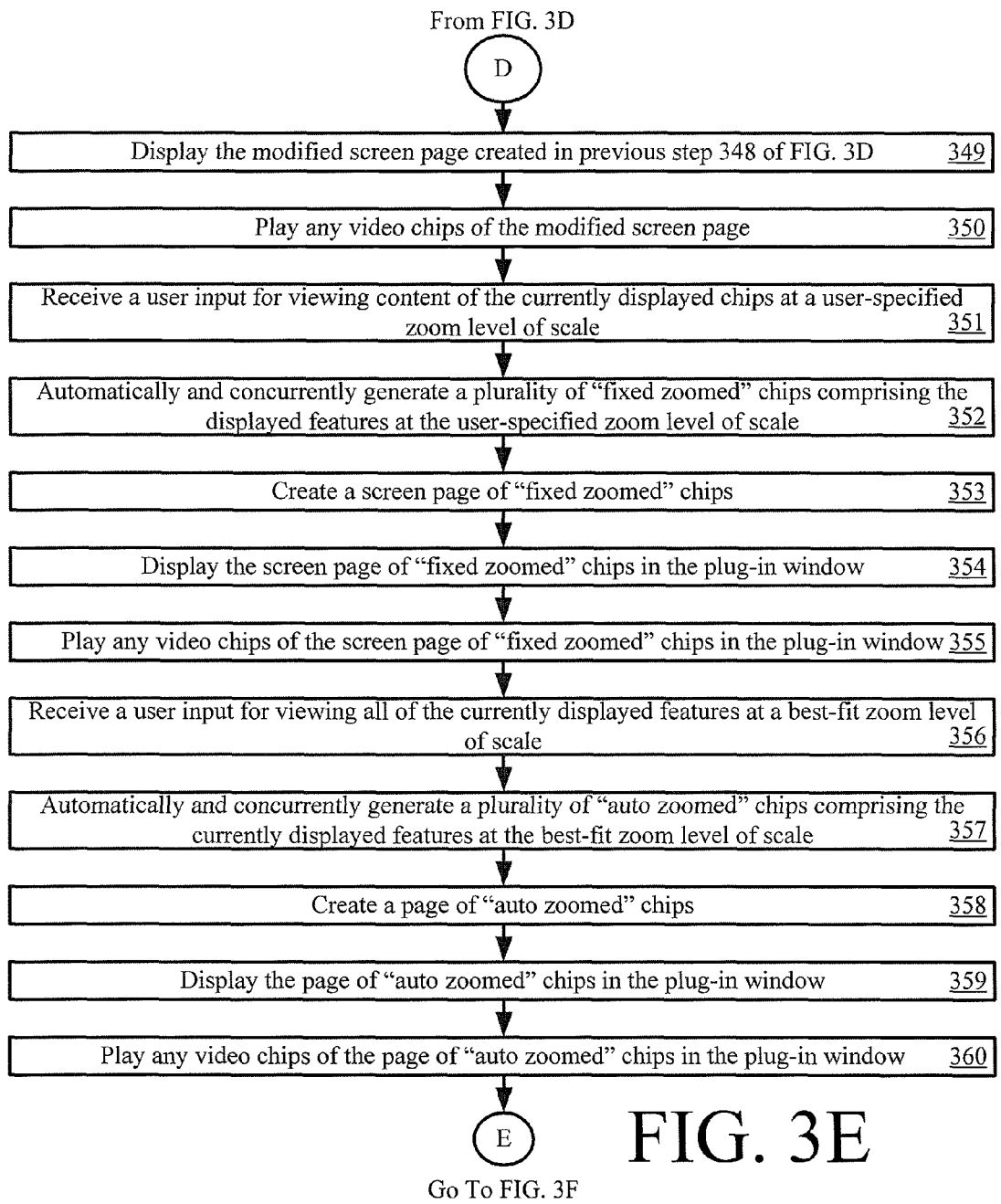

Referring again to FIG. 3B, the method 300 continues with step 324 of FIG. 3C. Referring now to FIG. 3C, step 324 involves displaying the first screen page, the second screen page or the third screen page in the plug-in window. A schematic illustration of an exemplary screen page of chips 902 displayed in a plug-in window 702 is provided in FIG. 9. As shown in FIG. 9, the screen page 902 comprises a third screen page since it includes an array of chip images 904, 912 and video chips 910. The array is a grid 906 defined by a plurality of grid cells 908. A different chip 904, 910, 912 is presented within each grid cell 908 of the grid 906. Notably, the chip images 904 are of a different type than the chip images 912. For example, the chip images 912 comprise chip images generated using imagery data for at least one photograph. The chip images 904 comprise chip images generated using imagery data for at least one topographical map. Embodiments of the present invention are not limited in this regard.

Upon completing step 324, the method 300 continues with step 325. In step 325, the displayed video chips (e.g., video chips 910 of FIG. 9) are simultaneously or concurrently played, i.e., the segments of the video recordings defining the video chips are reproduced by sequentially displaying images in the image sequences thereof.

Figure 11:
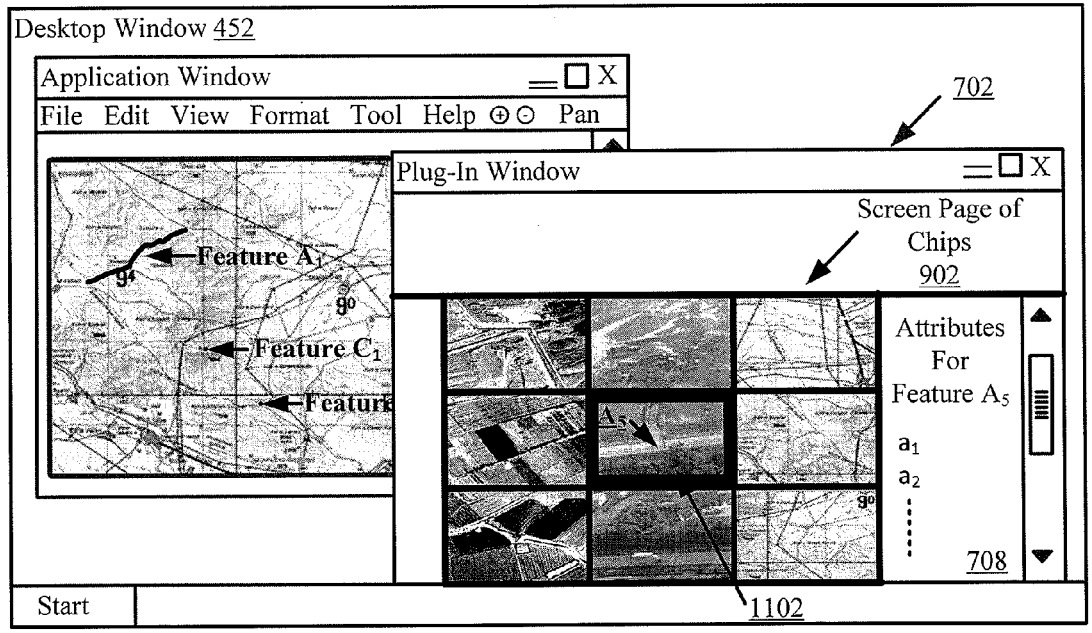
FIGS. 11-12 each provide a schematic illustration of an exemplary screen page of chips that is useful for understanding the present invention.

In a next step 326, a user input selecting a chip of the displayed screen page is received by the computing device (e.g., computing device 102 of FIG. 1). The selected chip may be a chip image or a video chip. The chip can be selected by moving a mouse cursor over the chip and clicking a mouse button. A schematic illustration of a selected chip 1102 is provided in FIG. 11. As shown in FIG. 11, the selected chip 1102 is annotated with a relatively thick and distinctly colored border. Embodiments of the present invention are not limited in this regard. Any type of mark or annotation can be used to illustrate that a particular chip has been selected.

In response to the user input of step 326, step 327 is performed where attribute information for the feature (e.g., feature $A_5$ of FIG. 11) contained in the selected chip (e.g., video chip 1102 of FIG. 11) is displayed in an attribute pane (e.g., attribute pane 708 of FIG. 11) of the plug-in window (e.g., plug-in window 702 of FIG. 11). A schematic illustration of an exemplary plug-in window 702 is provided in FIG. 11 which has attribute information $a_1, a_2$ displayed therein.

Figure 12:
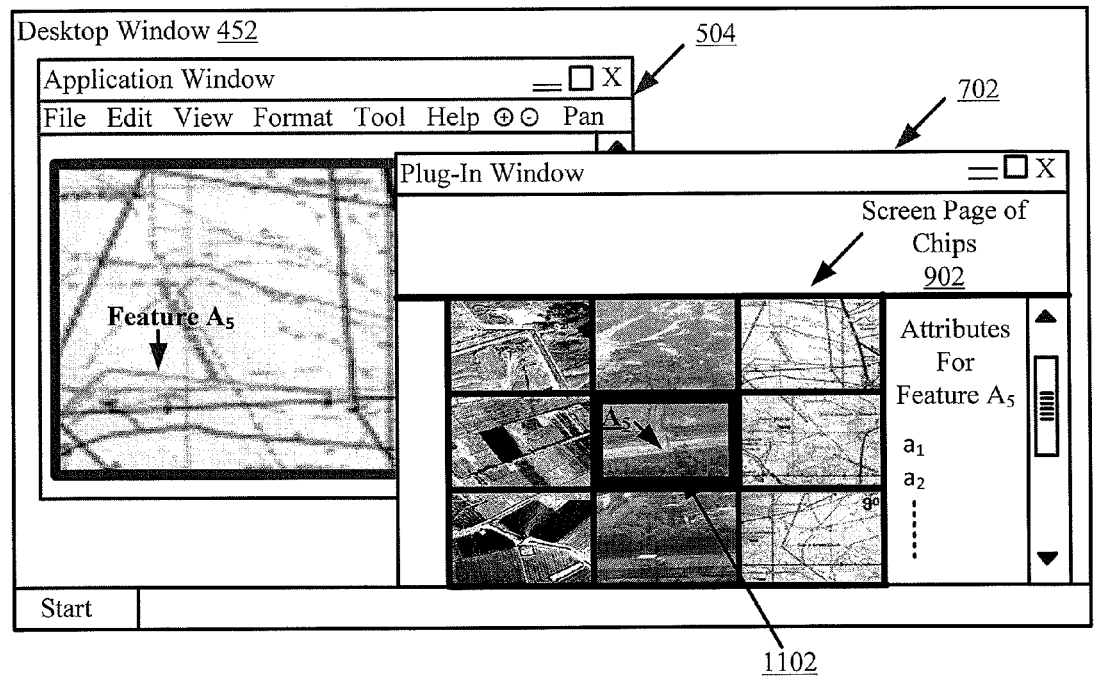

In a next optional step 328, operations are performed by the feature analysis plug-in to update the information presented in the application window. For example, if a first image is displayed in the application window, then it is updated such that the content of the selected chip (e.g., chip 1102 of FIG. 11) is displayed in the application window. In this scenario, the application window can be updated to include a new panned and/or zoomed view of the first image. A schematic illustration of an exemplary updated application window is provided in FIG. 12. As shown in FIG. 12, the application window 504 has displayed therein the feature $A_5$ which is contained in the selected chip 1102 of FIG. 11. Alternatively, if a first video stream is displayed in the application window, then optional step 328 would involve automatically fast forwarding and/or fast reversing the first video stream until the segment thereof comprising the feature (e.g., feature $A_5$ of FIG. 11) of the selected chip (e.g., video chip 1102 of FIG. 11) is displayed in the application window. Notably, the first video stream can be the same video stream or a different video stream from which the selected chip (e.g., video chip 1102 of FIG. 11) was generated.

Referring again to FIG. 3C, the method 300 continues with step 329. In step 329, a user input is received by the computing device for sorting all or a portion of the first chip images and/or the first video chips based on at least one attribute of the features contained therein. The user input is facilitated by a GUI widget (e.g., GUI widget 814 of FIG. 8A) of the plug-in window (e.g., the plug-in window 702 of FIG. 7). The GUI widget may be configured to allow a user to specify the attribute(s) that the sorting should be based on, and/or specify whether the chips should be sorted in an ascending order or a descending order.

In response to the user input of step 329, all or a portion of the first chip images and/or first video chips are sorted in an ascending order or a descending order based on the user-specified feature attribute(s), as shown by step 330. For example, a plurality of chips are sorted into an ascending or descending order based on the number of lanes, the lengths and/or the types of the roads as reflected in the feature attribute(s). The road types include, but are not limited to, a parkway, a highway, a byway, a freeway, a motorway, a driveway, an alley, an arterial road, an avenue, an expressway, a turnpike, a back road, a boulevard, a collector road, a cul-desac, a dirt road, a frontage road, and a street. Embodiments of the present invention are not limited in this regard.

Thereafter in step 331, at least one screen page of sorted chips is created by the feature analysis plug-in. The sorted chips can include at least one chip image and/or at least one video chip. The sorted chips are arranged on the screen page in a pre-defined grid format or a matrix format. A first screen page of sorted chips is then displayed in the plug-in window, as shown by step 332. The first screen page of sorted chips may or may not include the same first chips images and/or the same first video chips as the previously displayed screen page of chips (e.g., screen page 902 of FIG. 12). For example, if the first grid has a grid size of three cells by three cells, then chips one through nine of one hundred chips are presented therein. Thereafter, an ordered list is generated by sorting the one hundred chips by at least one attribute (e.g., the number of lanes, the lengths and/or the types of the roads visually represented by features contained therein). In this scenario, the first grid is updated to include the first nine chips identified in the ordered list. These first nine chips of the ordered list may include one or more of the original chips (e.g., chip 1102 of FIG. 11), as well as one or more chips (e.g., chips 1304-1318 of FIG. 13) different than the original chips.

Figure 13:
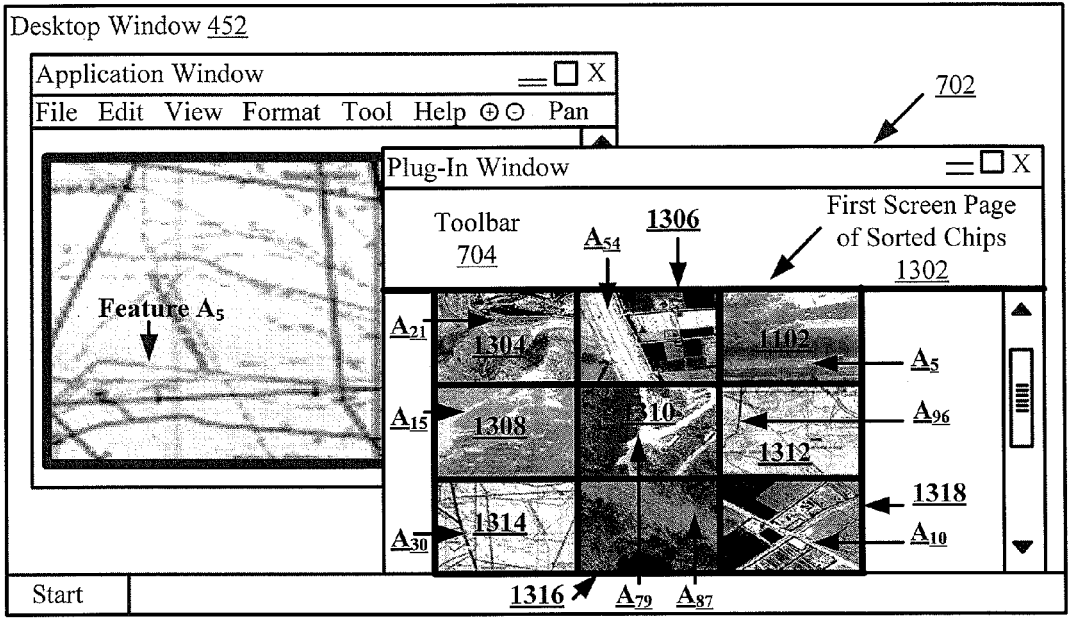
FIGS. 13 and 14 each provide a schematic illustration of an exemplary screen page of sorted chips that is useful for understanding the present invention.

A schematic illustration of an exemplary first screen page of sorted chips 1302 is provided in FIG. 13. As shown in FIG. 13, the first page of sorted video chips 1202 includes the chips 1102 and 1304-1318 comprising features $A_{21}$, $A_{54}$, $A_5$, $A_{15}$, $A_{79}$, $A_{96}$, $A_{30}$, $A_{87}$, $A_{10}$, respectively. Notably, only video chip 1102 is contained in the screen page of chips 902 of FIG. 9. Embodiments of the present invention are not limited in this regard. For example, the first screen page of sorted chips 1302 can alternatively include none of the chips contained in screen page 902 of FIG. 9, or at least one of the chips contained in the screen page 902 of FIG. 2. After the first screen page of chips is displayed in the plug-in window, optional step 333 is performed where the video chips of the displayed screen page (e.g., video chips 1102 and 1308 of screen page 1302 of FIG. 13) are simultaneously or concurrently played.

In a next step 334, a user input is received by the computing device (e.g., computing device 102 of FIG. 1) for viewing a second screen page of sorted chips in the plug-in window. The user input is facilitated by a GUI widget (e.g., GUI widget 804 or 806 of FIG. 8A) of the plug-in window (e.g., the plug-in window 702 of FIG. 7). The GUI widget may be configured to facilitate moving through screen pages of unsorted and/or sorted chips. In this regard, the GUI widget includes arrow buttons that allow a user to move forward and backward through the screen pages of unsorted and/or sorted chips. Alternatively or additionally, the GUI widget may be configured to facilitate jumping to a desired screen page of unsorted and/or sorted chips for review. In this regard, the GUI widget includes a text box for entering a screen page number and a search button for causing the screen page of unsorted and/or sorted chips having the entered screen page number to be displayed in the display area (e.g., display area 706 of FIG. 7) of the plug-in window (e.g., plug-in window 702 of FIG. 7).

Figure 14:
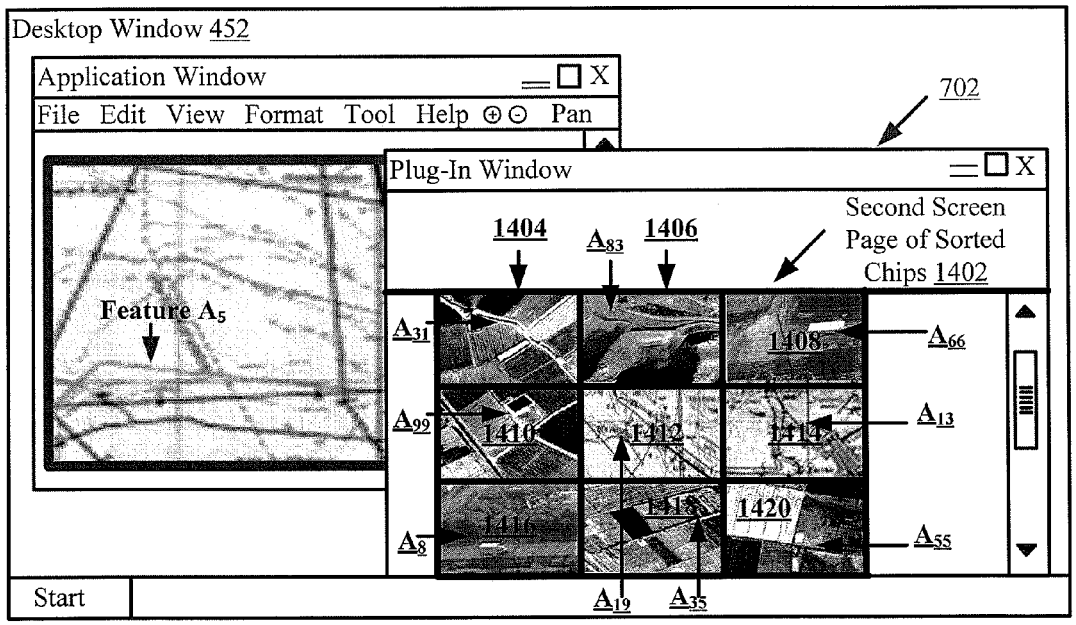

After the user input is received in step 334, step 335 where a second screen page of the sorted chips is displayed in the plug-in window. A schematic illustration of an exemplary second screen page of sorted chips 1402 is provided in FIG. 14. As shown in FIG. 14, the second screen page of sorted chips 1402 includes the chips 1404-1420 comprising features $A_{31}$, $A_{83}$, $A_{66}$, $A_{99}$, $A_{19}$, $A_{13}$, $A_8$, $A_{35}$, $A_{55}$, respectfully. Notably, video chip 1416 is contained in the screen page of chips 902 of FIG. 9. Embodiments of the present invention are not limited in this regard. For example, the second screen page of sorted chips 1402 can alternatively include none of the chips contained in screen page 902 of FIG. 9, or at least one of the chips contained in the screen page 902 of FIG. 2. Thereafter, the video chips (e.g., video chips 1408 and 1416) of the displayed screen page are simultaneously or concurrently played, as shown by step 336. Upon completing step 336, the method 300 continues with step 337 of FIG. 3D.

As shown in FIG. 3D, step 337 involves receiving, by a computing device (e.g., computing device 102 of FIG. 1), a user input for filtering the chips of the second screen page of sorted chips by one or more feature attributes thereof. The user input is facilitated by a GUI widget (e.g., GUI widget 812 of FIG. 8A) of the plug-in window (e.g., the plug-in window 702 of FIG. 7). The GUI widget is configured to facilitate a selection of features for display in the display area (e.g., display area 706 of FIG. 7) of the plug-in window (e.g., plug-in window 702 of FIG. 7) based on their attributes. In this regard, the GUI widget may include, but is not limited to, a "filter control" button and a "filter setting" drop down button. The "filter control" button facilitates the enablement and disablement of an attribute filter function. The "filter setting" drop down button facilitates the display of a drop-down box for assembling a query phrase defining an attribute filter (e.g., ["NUMBER OF LANES"='2'], ["LENGTH"<'50 MILES'], and/or ["TYPE"='ARTERIAL THOROUGHFARE']). A schematic illustration of an exemplary drop-down box 850 is provided in FIG. 8B.

Upon receipt of the user input in step 337, the feature analysis plug-in performs operations to filter the chips of the displayed second screen page of sorted chips, as shown by step 338. In a next step 339, a screen page of filtered chips is created by the feature analysis plug-in. The screen page of filtered chips is created by removing at least one chip from the displayed second screen page of sorted chips in accordance with the results of the filtering operations performed in previous step 338. Thereafter, the screen page of filtered chips is displayed in the display area (e.g., display area 706 of FIG. 7) of the plug-in window (e.g., plug-in window 702 of FIG. 7), as shown by step 340. The displayed video chips are then simultaneously or concurrently played in step 341.

Figure 15:
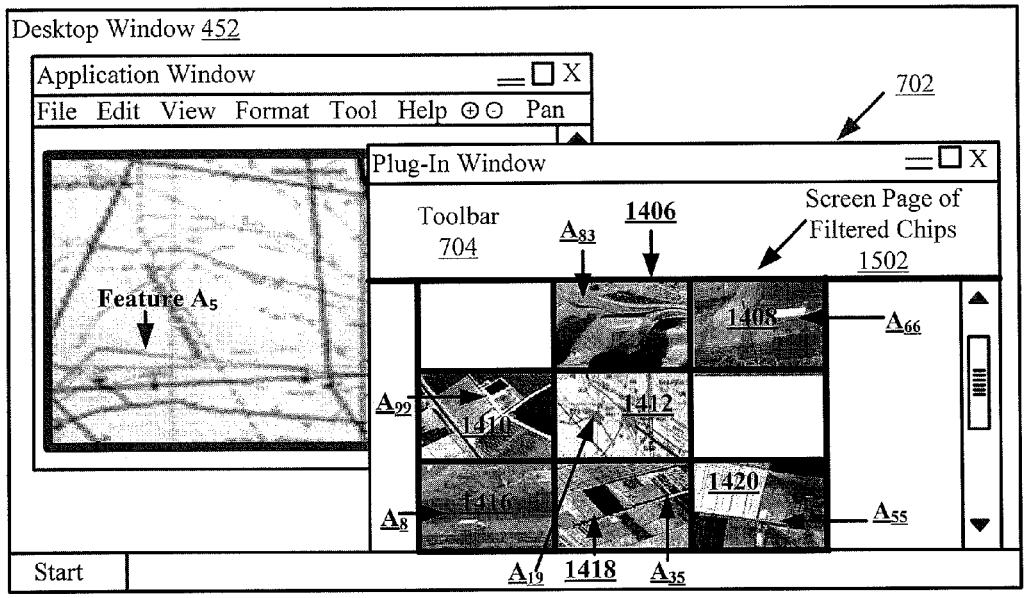
FIG. 15 is a schematic illustration of an exemplary screen page of filtered chips that is useful for understanding the present invention.

A schematic illustration of an exemplary screen page of filtered chips 1502 is provided in FIG. 15. As shown in FIG. 15, the screen page of filtered chips 1502 includes the chips 1406-1412, 1416-1420 contained in the second screen page of sorted chips 1402 of FIG. 14. However, the screen page of filtered chips 1502 does not include chip images 1404 and 1414 in grid cells thereof. In this regard, it should be understood that the chip images 1404 and 1414 have been removed from the second screen page of sorted chips 1402 of FIG. 14 to obtain the screen page of filtered chips 1502. Embodiments of the present invention are not limited in this regard.

Referring again to FIG. 3D, the method 300 continues with step 342 where the computing device (e.g., computing device 102 of FIG. 1) receives a user input for viewing only a portion (e.g., a percentage) of the first chip images and/or the first video chips generated in previous step 322. The user input is facilitated by a GUI widget (e.g., GUI widget 820 of FIG. 8A) of the plug-in window (e.g., the plug-in window 702 of FIG. 7). The GUI widget is configured to facilitate the display of a random sample of chips comprising features of a particular feature class for visual inspection. As such, the GUI widget may include, but is not limited to, a button for enabling/disabling a random sampling function of the feature analysis plug-in and a drop down menu from which a percentage value can be selected.

In response to the reception of the user input in step 342, step 343 is performed where "N" chip images of the first chip images generated in previous step 322 are randomly selected, and/or "M" video chips of the first video chips generated in previous step 322 are randomly selected. The values of "N" and "M" are determined based on the percentage value selected in previous step 342. For example, if one hundred chips were generated in step 322 and the percentage value of twenty was selected in step 345, then twenty chips would be randomly selected from the one hundred chips. The twenty chips can include any number of first chip images (e.g., 0 to 20) and any number of first video chips (e.g., 0 to 20). As such, the values of "N" and "M" are each equal to a number falling with the range from zero to twenty, inclusive. Embodiments of the present invention are not limited in this regard.

Upon completing step 343, step 344 is performed where the feature analysis plug-in creates at least one screen page of sampled chips including all or a portion of the "N" chip images and/or the "M" video chips arranged in a grid or matrix format. Notably, the screen pages of sampled chips can have a default grid size or a user-specified grid size. For example, if a grid size is four cells by four cells and "N+M" equals twenty, then two screen pages of sampled chips would be created in step 344 since each screen page can contain a maximum of sixteen chips. In contrast, if the grid size is five cells by five cells and "N+M" equals twenty, then only one screen page of sampled chips would be created in step 344 since the screen page can contain a maximum of twenty-five chips. Embodiments of the present invention are not limited in this regard. In a next step 345, the screen page of sampled chips is displayed in the plug-in window. Thereafter, the video chips of the displayed screen page are simultaneously or concurrently played, as shown by step 346.

Figure 16:
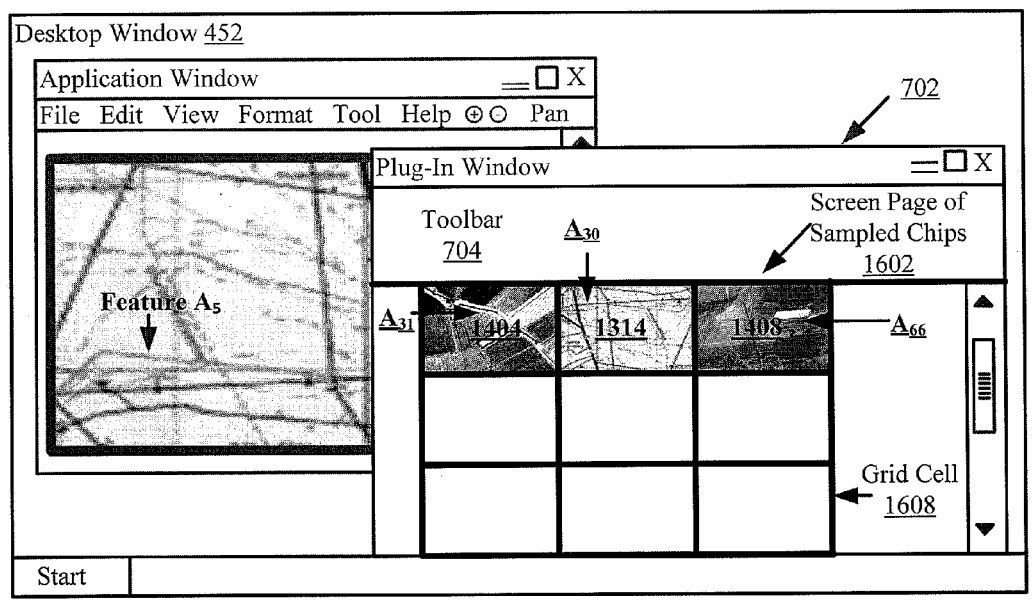
FIG. 16 is a schematic illustration of an exemplary screen page of sampled chips that is useful for understanding the present invention.

A schematic illustration of an exemplary screen page of sampled chips 1602 is provided in FIG. 16. As shown in FIG. 16, the screen page of sampled chips 1602 includes only three chips 1404, 1314, 1408. In this regard, the total number of first chips is nine and the percentage selected in step 342 is thirty-three percent. Accordingly, the value of "N+M" is three. The three chips contained in the screen page 1602 were randomly selected from the nine first chips (i.e., the first chip images and the first video chips). Embodiments of the present invention are not limited to the particularities of this example.

Referring again to FIG. 3D, the method 300 continues with step 347 where the computing device (e.g., computing device 102 of FIG. 1) receives a user input for changing a grid size of the screen page(s) of sampled chips from a first grid size (e.g., three cells by three cells) to a second grid size (e.g., two cells by two cells). The user input is facilitated by a GUI widget (e.g., GUI widget 808 of FIG. 8A) of the plug-in window (e.g., the plug-in window 702 of FIG. 7). The GUI widget is configured to facilitate a selection of a grid size from a plurality of pre-defined grid sizes. As such, the GUI widget may include, but is not limited to, a drop down list listing a plurality of pre-defined grid sizes.

In response to the reception of the user input in step 347, step 348 is performed where the feature analysis plug-in creates at least one modified screen page including a grid of sampled chips having the second grid size. The modified screen page is then displayed in the plug-in window, as shown by step 349 of FIG. 3E. In a next step 350 of FIG. 3E, the video chip(s) of the modified screen page of sampled chips is(are) played.

Figure 17:
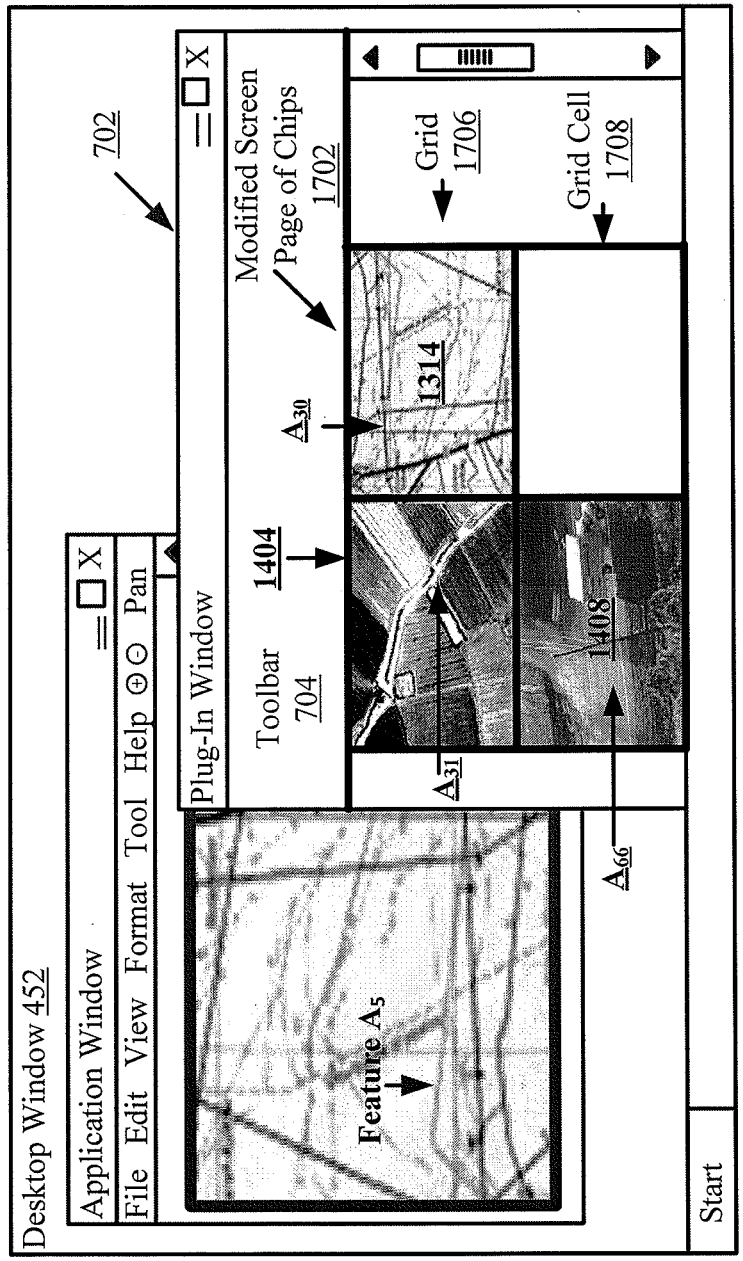
FIG. 17 is a schematic illustration of an exemplary modified screen page of chips that is useful for understanding the present invention.

A schematic illustration of an exemplary modified screen page of sampled chips 1702 is provided in FIG. 17. As shown in FIG. 17, the modified screen page 1702 comprises a grid 1706 with a grid size of two cells by two cells. Three of the four grid cells 1708 includes a chip 1404, 1314, 1408. The chips are the same as the chips in the screen page of sampled video chips 1602 of FIG. 16. Embodiments of the present invention are not limited in this regard. For example, the modified screen page 1702 may include less or more than the total number of chips contained in screen page 1602. In the "less than" scenario, the absence of certain chips from screen page 1602 would be a result of the reduction in grid size from three cells by three cells to two cells by two cells. In the "more than" scenario, the inclusion of certain chips in screen page 1702 would result from an increase in grid size. Notably, the display area for each chip of screen page 1702 is larger than the display area for each chip of a screen page 1602. This increase of display area for the chips is also a result of the reduction in grid size from three cells by three cells to two cells by two cells. It should also be noted that larger portions of the images surrounding features thereof are displayed in the grid cells 1708 as compared to that displayed in corresponding grid cells 1608 of FIG. 16. This increase in surrounding portions of the images is at least partially due to the reduction in grid size as well as the fact that the chips of grid cells 1708 have the same spatial zoom level of scale or resolution. Embodiments of the present invention are not limited in the particularities of FIG. 17.

Referring again to FIG. 3E, the method 300 continues with step 351. In step 351, the computing device (e.g., computing device 102 of FIG. 1) receives a user input for viewing content of all of the currently displayed chips at a user-specified zoom level of scale. The user input is facilitated by a GUI widget (e.g., GUI widget 826 of FIG. 8A) of the plug-in window (e.g., plug-in window 702 of FIG. 7). The GUI widget is configured to facilitate the performance of manual-scale operations by the feature analysis plug-in. The manual-scale operations are operative to adjust the zoom level of scale of all of the displayed chips from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget may include, but is not limited to, a drop down list populated with a plurality of whole number percentage values.

After the reception of the user input in step 351, the feature analysis plug-in performs operations for automatically and concurrently generating a plurality of "fixed zoomed" chips at the user-specified zoom level of scale, as shown by step 352. In a next step 353, the feature analysis plug-in performs operations to create a screen page of "fixed zoomed" chips. Thereafter in step 354, the screen page of "fixed zoomed"

chips is displayed in the plug-in window. In a next step 344, the "fixed zoomed" video chip(s) of the displayed screen page is(are) played.

Figure 18:
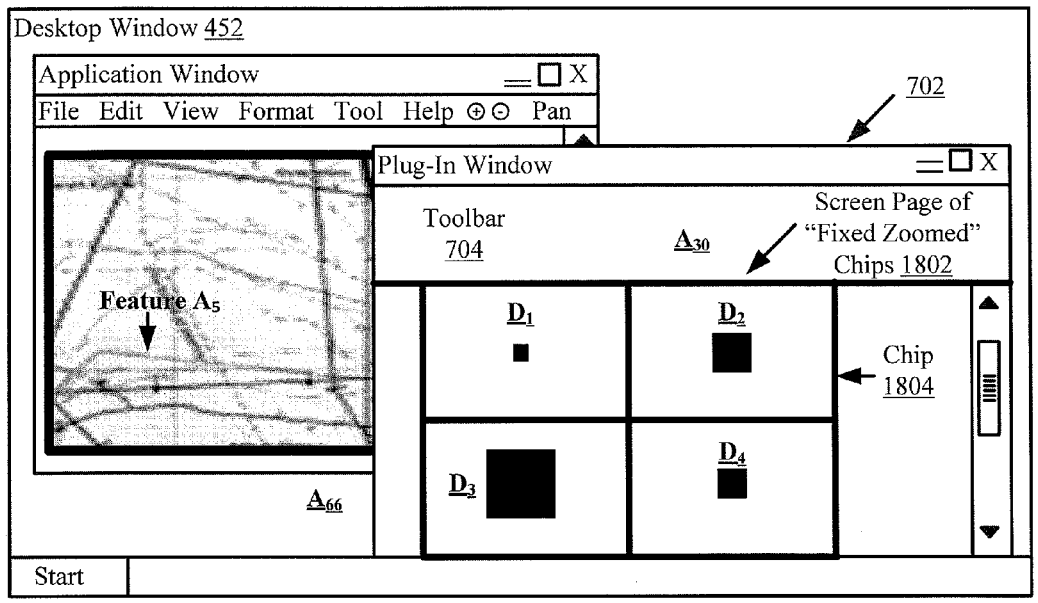
FIG. 18 is a schematic illustration of an exemplary screen page of "fixed zoomed" chips that is useful for understanding the present invention.

A schematic illustration of an exemplary screen page of "fixed zoomed" chips 1802 is provided in FIG. 18. As shown in FIG. 18, all of the chips 1804 have the same zoom level of scale. As such, the smallest feature $D_1$ appears smaller than the larger features $D_2$, $D_3$, $D_4$. Similarly, the largest feature $D_3$ appears larger than the smaller features $D_1$, $D_2$, $D_4$. Notably, the chips 1804 include zero or more chip images and zero or more video chips. Embodiments of the present invention are not limited to the particularities of FIG. 18.

Referring again to FIG. 3E, the method 300 continues with step 356. In step 356, the computing device (e.g., computing device 102 of FIG. 1) receives a user input for viewing all of the currently displayed features (e.g., $D_1$, $D_2$, $D_3$, $D_4$ of FIG. 18) at a best-fit zoom level of scale. The user input is facilitated by a GUI widget (e.g., GUI widget 828 of FIG. 8A) of the plug-in window (e.g., plug-in window 702 of FIG. 7). The GUI widget is configured to facilitate the viewing of each displayed feature at its best-fit zoom level of scale or its pre-defined maximum zoom level of scale. As such, the GUI widget may include, but is not limited to, a button for at least enabling auto-scale operations of the feature analysis plug-in and disabling the manual-scale operations of the feature analysis plug-in.

In response to the reception of the user input in step 356, the feature analysis plug-in performs operations to automatically and concurrently generate a plurality of "auto zoomed" chips comprising the currently displayed features at the best-fit zoom level of scale, as shown by step 357. In a next step 358, the feature analysis plug-in performs operations to create a screen page of "auto zoomed" chips. Thereafter in step 359, the page of "auto zoomed" video chips is displayed in the plug-in window. The "auto zoomed" video chip(s) is(are) then played, as shown by step 360.

Figure 19:
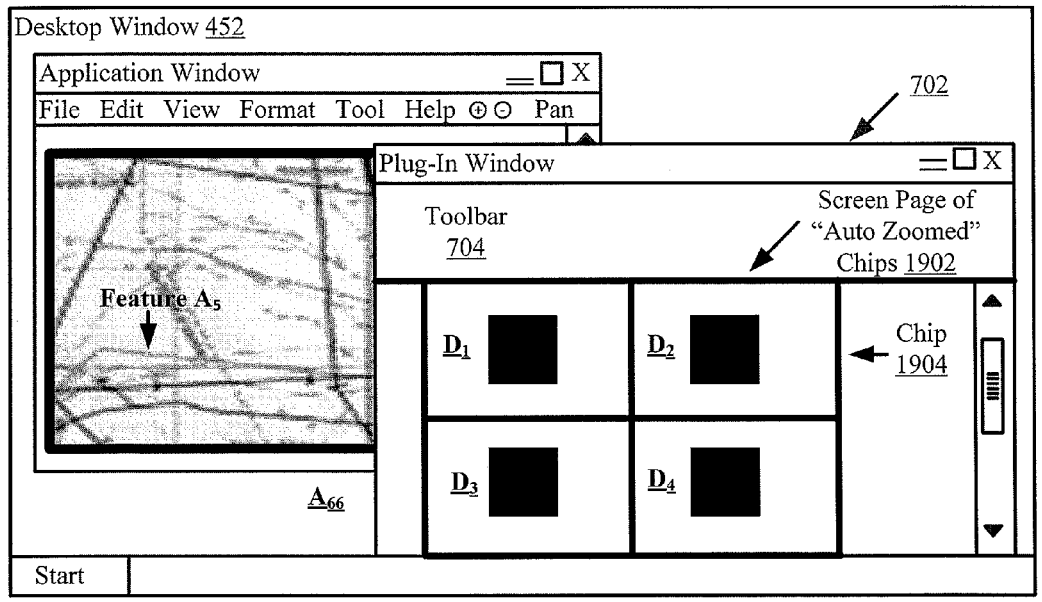
FIG. 19 is a schematic illustration of an exemplary screen page of "auto zoomed" video chips that is useful for understanding the present invention.

A schematic illustration of an exemplary screen page of "auto zoomed" chips 1902 is provided in FIG. 19. As shown in FIG. 19, each of the chips 1904 has a different zoom level of scale. As such, all of the features $D_1$, $D_2$, $D_3$, $D_4$ appear to be of the same size regardless of their actual relative physical sizes. Notably, the chips 1904 can comprise zero or more chip images, and zero or more video chips. Embodiments of the present invention are not limited to the particularities of FIG. 19.

Figure 3F:
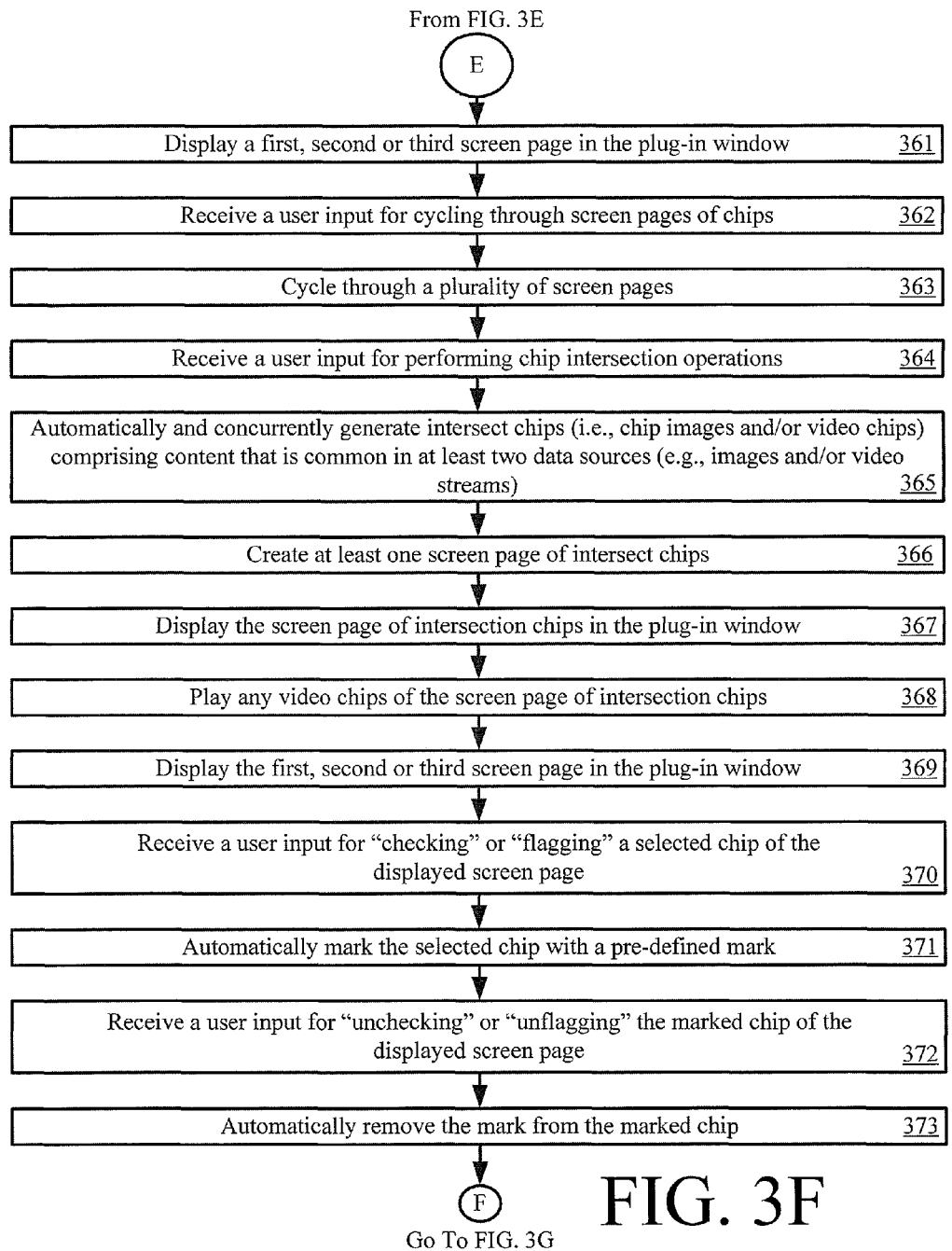

Referring now to FIG. 3F, the method 300 continues with step 361 where a first screen page, a second screen page or a third screen page is displayed in the plug-in window. In a next step 362, the computing device (e.g., computing device 102 of FIG. 1) receives a user input for cycling through a plurality of screen pages. The screen pages which are cycled through include, but are not limited to, first screen pages for multiple images and/or second screen pages for multiple video streams. The user input is facilitated by a GUI widget (e.g., GUI widget 824 of FIG. 8A) of the plug-in window. The GUI widget is configured to allow manual cycling and/or automatic cycling between screen pages for a plurality of data sources. As such, the GUI widget may include, but is not limited to, a check box for enabling and disabling automatic data source cycling operations of the feature analysis plug-in, a slider for setting the rate at which the data sources automatically cycle, and/or a button for manually commanding when to change the data source.

In response to the reception of the user input in step 362, the feature analysis plug-in performs operations for cycling through first screen pages and/or second screen pages, as shown by step 363. Schematic illustrations of exemplary data source cycling processes performed in step 363 are provided in FIGS. 20-21.

Figure 20:
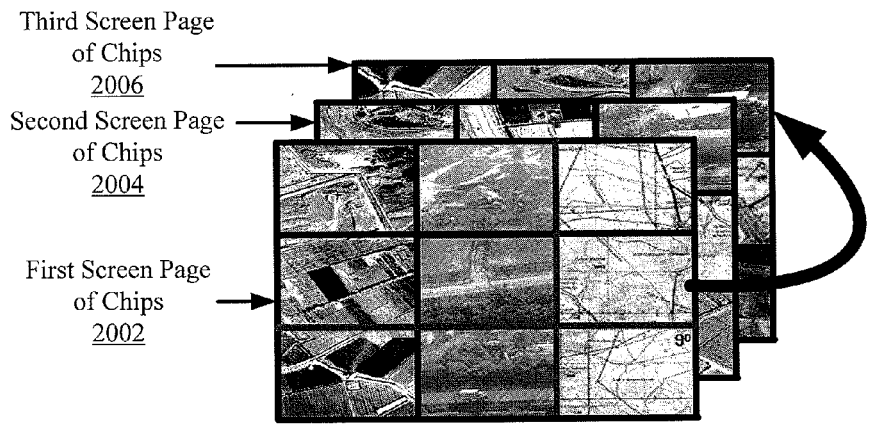
FIGS. 20 and 21 each provide a schematic illustration of an exemplary video cycling process that is useful for understanding the present invention.

As shown in FIG. 20, a first iteration of the data source cycling process begins with the display of a first screen page 2002 generated using a first ortho-rectified image, a first video stream, and a first digital raster graphic. Upon the expiration of a pre-defined amount of time or in response to a first user input, a second screen page of chips 2004 is displayed in the plug-in window. The second screen page of chips 2004 was generated using a second ortho-rectified image, a second video stream, and a second digital raster graphic. The first iteration of the data source cycling process ends with the display of a third screen page of video chips 2006 in response to a second user input or upon the expiration of the pre-defined amount of time. The third screen page of chips 2006 was generated using a third ortho-rectified image, a third video stream, and a third digital raster graphic. Thereafter, a second iteration of the data source cycling process can begin such that the screen pages of chips 2002, 2004, 2006 are cycled through again. Embodiments of the present invention are not limited to the particularities of FIG. 20. For example, the data sources can include the same or different types as those employed to generated screen pages 2002, 2004, 2006. Alternative or additional data sources can include, but are not limited to, digital elevation models.

Figure 21:
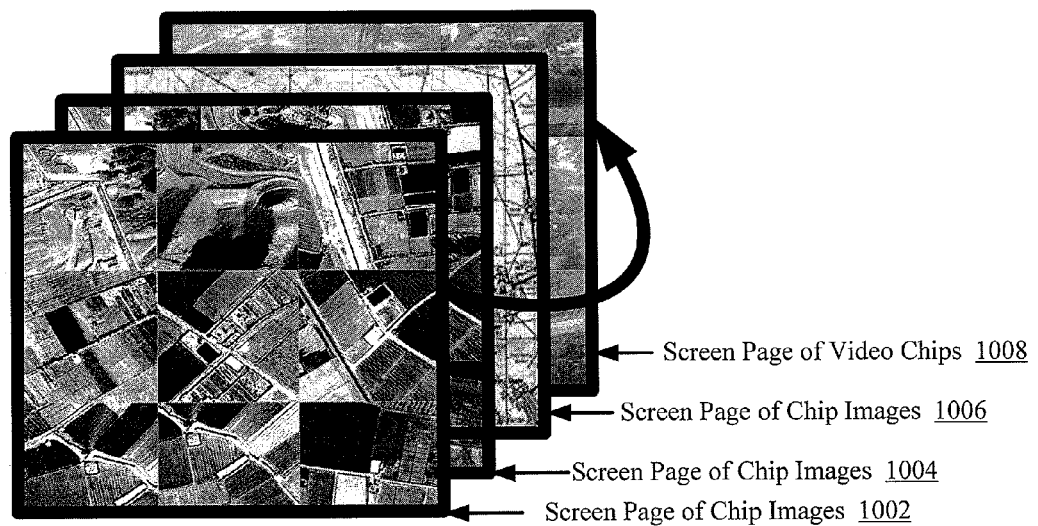

As shown in FIG. 21, a first iteration of the data source cycling process begins with the display of a screen page of chip images 1002 which was generated using a first ortho-rectified image. Upon the expiration of a pre-defined amount of time or in response to a first user input, a screen page of chip images 1004 is displayed in the plug-in window. The screen page of chip images 1004 was generated using a second ortho-rectified image. Upon the expiration of a pre-defined amount of time or in response to a second user input, a screen page of chip images 1006 is displayed in the plug-in window. The screen page of chip images was generated using a first digital raster graphic. The first iteration of the data source cycling process ends with the display of a screen page of video chips 1008 in response to a third user input or the expiration of a pre-defined amount of time. The screen page of video chips 1008 was generated using a first video stream. Thereafter, a second iteration of the data source cycling process can begin such that the screen pages of chips 1002-1008 are cycled through again. Embodiments of the present invention are not limited to the particularities of FIG. 21. For example, the data sources can include the same or different types as those employed to generated screen pages 1002-1008. Alternative or additional data sources can include, but are not limited to, digital elevation models.

Referring again to FIG. 3F, the method 300 continues with step 364. In step 364, the computing device (e.g., computing device 102 of FIG. 1) receives a user input for performing chip intersection operations by the feature analysis plug-in. The user input is facilitated by a GUI widget (e.g., GUI widget 822 of FIG. 8A) of the plug-in window. The GUI widget is configured to facilitate the filtering of features to include those that lie within an area (e.g., a geographical area) that a plurality of images have in common or the union of a plurality of images. As such, the GUI widget may include, but is not limited to, a button for enabling and disabling an image intersection function of the feature analysis plug-in.

In response to the reception of the user input in step 364, the feature analysis plug-in automatically and concurrently generate intersect chips comprising areas that are common to two or more data sources (e.g., images and/or video streams), as shown by step 365. In a next step 366, the feature analysis plug-in performs operations to create at least one screen page of intersect chips for each of the plurality of data sources. Thereafter, one of the screen pages of intersect chips is displayed in the plug-in window, as shown by step 367. In a next step 368, any video chips of the displayed screen page are played.

Figure 22:
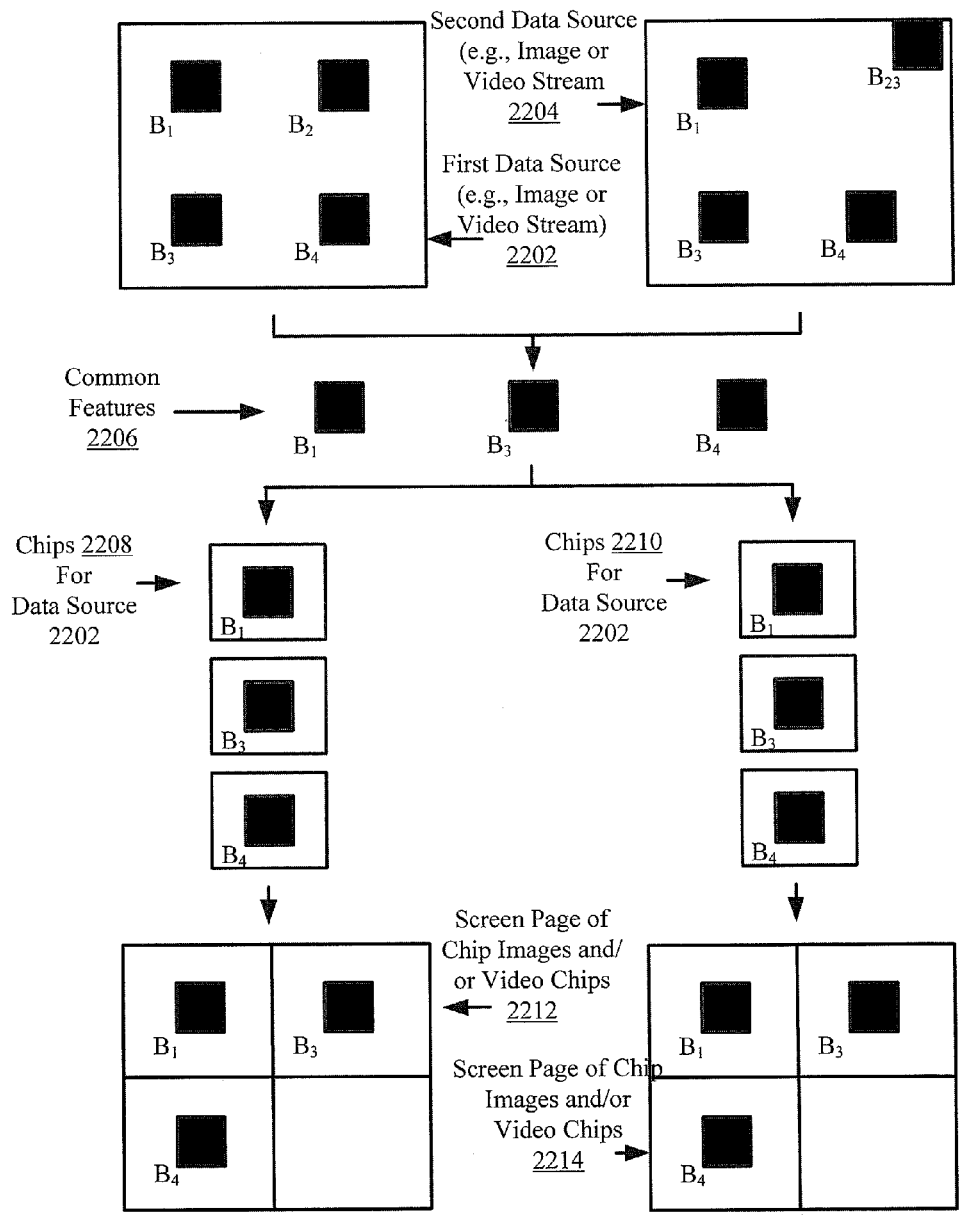
FIG. 22 is a schematic illustration of an exemplary content intersection process that is useful for understanding the present invention.

A schematic illustration of an exemplary content intersection process performed in step 365 and 366 of FIG. 3F is provided in FIG. 22. As shown in FIG. 22, the content intersection process being by analyzing at least two data sources 2202, 2204 to identify which features they have in common (e.g., features $B_1$, $B_3$ and $B_4$). Each of the data sources includes, but is not limited to, an image or a video stream. Once the common features 2206 are identified, chips 2208, 2210 comprising the common features 2206 are generated for each of the data sources 2202, 2204. Next, a screen page 2212 for the first data source 2202 is created. Similarly, a screen page 2214 for the second data source 2204 is created. Each of the screen pages 2212, 2214 includes chip images or video chips comprising the common features 2206. Embodiments of the present invention are not limited to the particularities of FIG. 22.

Referring again to FIG. 3F, the method 300 continues with step 369 where the first screen page, the second screen page or the third screen page is displayed in the plug-in window. In a next step 370, the computing device (e.g., computing device 102 of FIG. 1) receives a user input for "checking" or "flagging" a chip of the displayed screen page. A user may desire to mark a chip which contains an occurrence of information contained in a data source (e.g., an image or a video stream) that is relevant to a particular application. The application can include, but is not limited to, a situational awareness application, a natural disaster application, an unmanned vehicle application, a forensic application, a law enforcement application, a medication application, and a military application. Step 370 can involve selecting a chip of the displayed screen page. The chip can be selected by moving a mouse cursor over the chip and clicking a mouse button. In response to the click of the mouse button, a menu is presented to the user of the computing device (e.g., computing device 102 of FIG. 1). The menu includes a list of commands, such as a command for enabling "check/uncheck" operations of the feature analysis plug-in.

Figure 23:
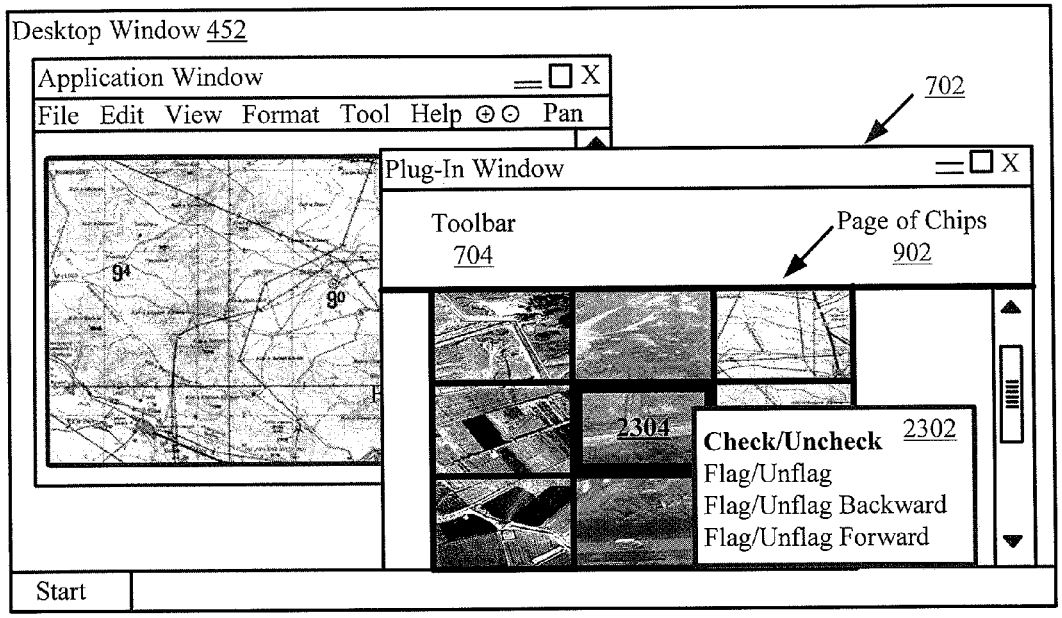
FIGS. 23, 25, 27 and 29 each provide a schematic illustration of an exemplary selected video chip and an exemplary menu of commands that is useful for understanding the present invention.
Figure 24:
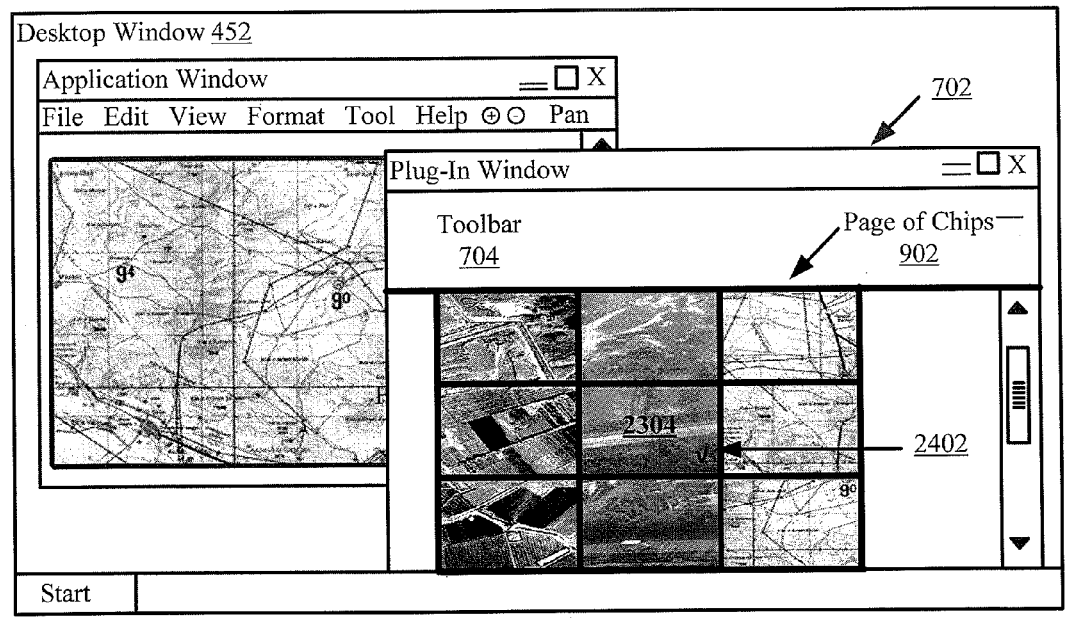
FIG. 24 is a schematic illustration of an exemplary "checked" chip that is useful for understanding the present invention.
Figure 25:
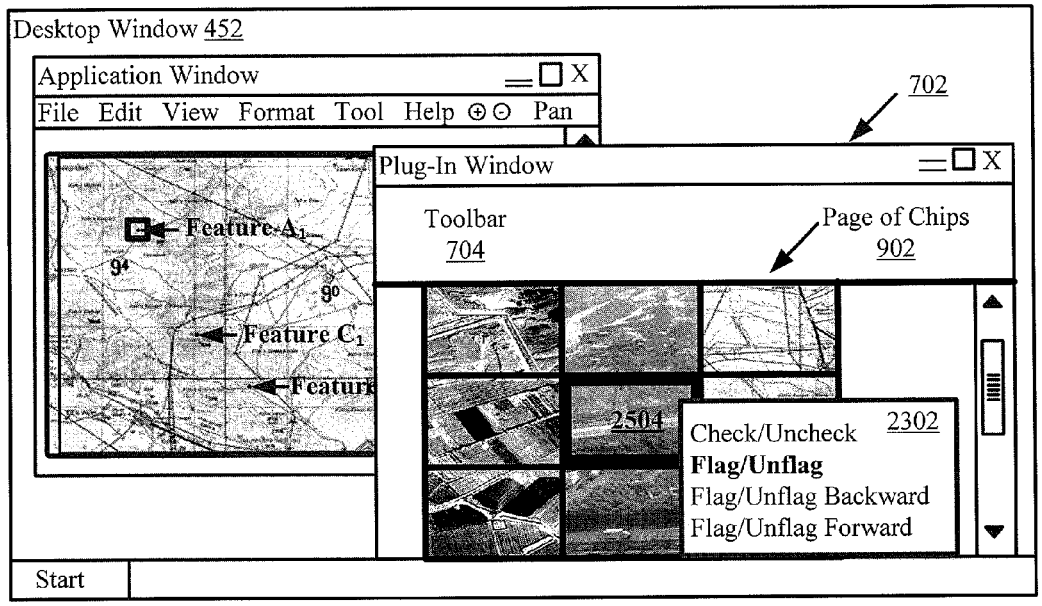
Figure 26:
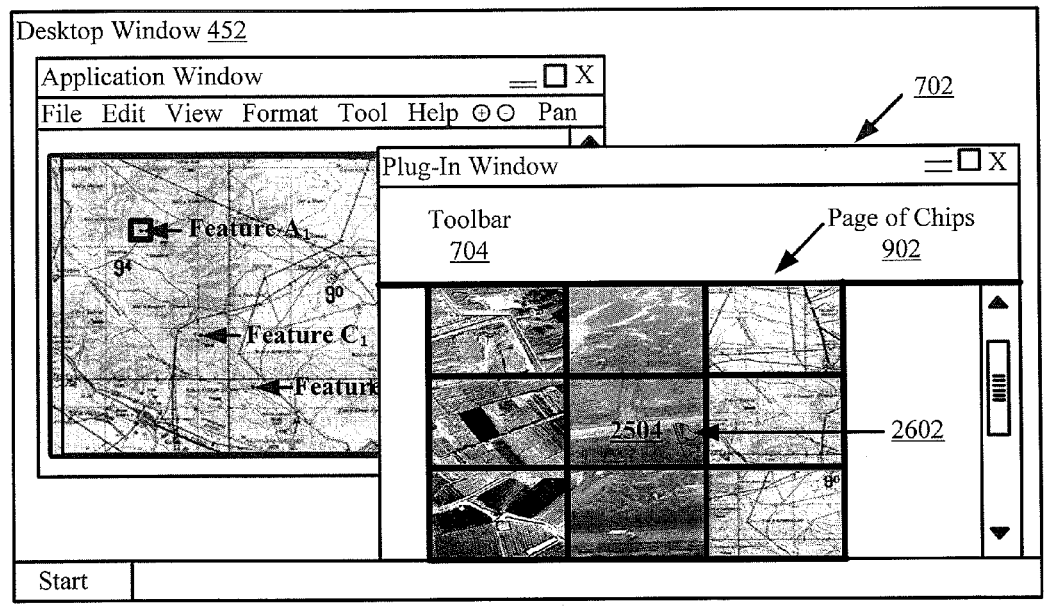
FIG. 26 is a schematic illustration of an exemplary "flagged" chip that is useful for understanding the present invention.

Schematic illustrations of exemplary selected chips 2304, 2504 and exemplary menus 2302 are provided in FIGS. 23 and 25. As shown in FIGS. 23 and 25, the selected chip 2304, 2504 is annotated with a relatively thick and distinctly colored border. Also, a selected command "Check/Uncheck" or "Flag/Unflag" of the menu 2302 is annotated by bolding the text thereof. Embodiments of the present invention are not limited in this regard. Any type of mark or annotation can be used to illustrate that a particular chip image has been selected and/or that a particular command of a menu has been selected.

In response to the reception of the user input in step 370 of FIG. 3F, the feature analysis plug-in performs step 371. In step 371, the selected chip is automatically marked with a pre-defined mark. A schematic illustration of a chip 2304 marked with a check 2402 is provided in FIG. 24. A schematic illustration of a chip 2504 marked with a flag 2602 is provided in FIG. 26. Embodiments of the present invention are not limited to the particularities of FIGS. 24 and 26. Any type of mark or annotation can be employed to illustrate that a chip image has been checked or flagged.

After completion of step 371, the method 300 continues with step 372 of FIG. 3F. In step 372, the computing device (e.g., computing device 102 of FIG. 1) receives a user input for "unchecking" or "unflagging" the marked chip (e.g., chip 2304 of FIG. 24 or chip 2504 of FIG. 26) of the displayed screen page of chips. In response to the user input of step 372, the mark (e.g., mark 2402 of FIG. 24 or mark 2602 of FIG. 26) is automatically removed from the marked chip (e.g., video chip 2304 of FIG. 24 or video chip 2504 of FIG. 26), as shown by step 373.

Figure 3G:
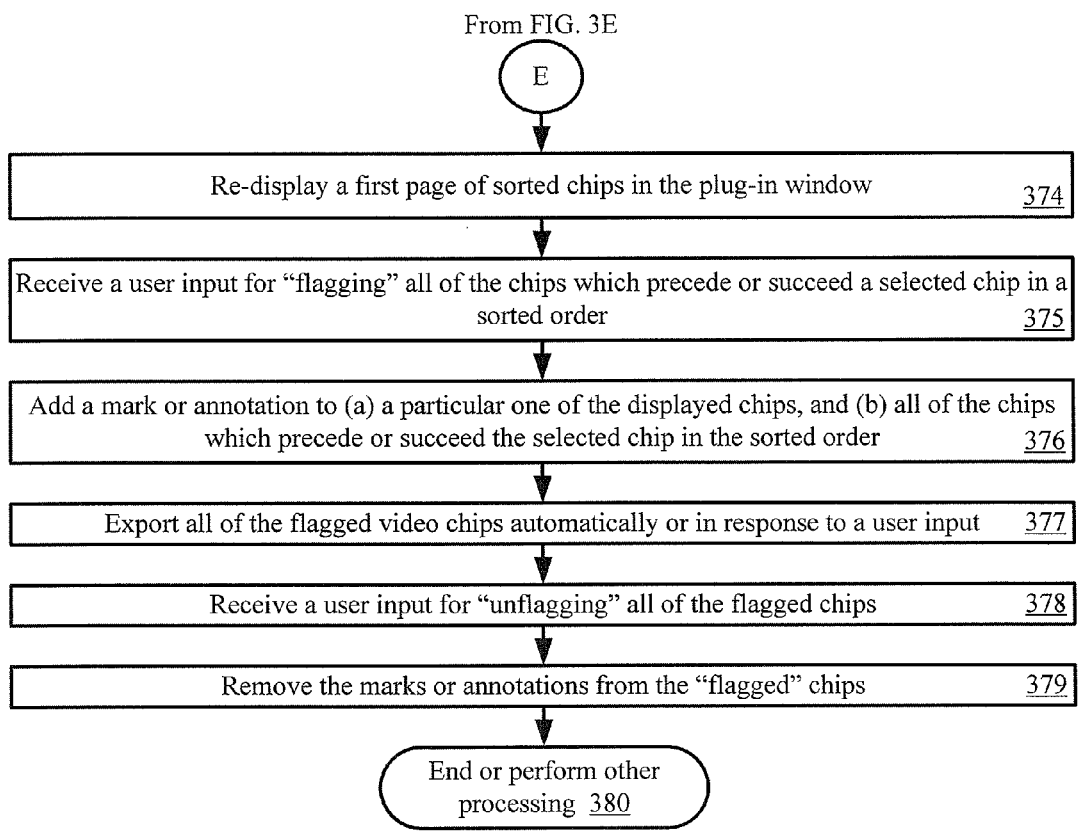

Referring now to FIG. 3G, the method 300 continues with step 374 where the first page of sorted chips is re-displayed in the plug-in window. In a next step 375, the computing device (e.g., computing device 102 of FIG. 1) receives a user input for "flagging" all of the chips which precede or succeed a selected one of the displayed chips in a sorted order. The chip is selected by moving a mouse cursor over the chip and clicking a mouse button. In response to the click of the mouse button, a menu is presented to the user of the computing device (e.g., computing device 102 of FIG. 1). The menu includes a list of commands, such as a command for enabling "Flag/Unflag Backward" or "Flag/Unflag Forward" operations.

Figure 27:
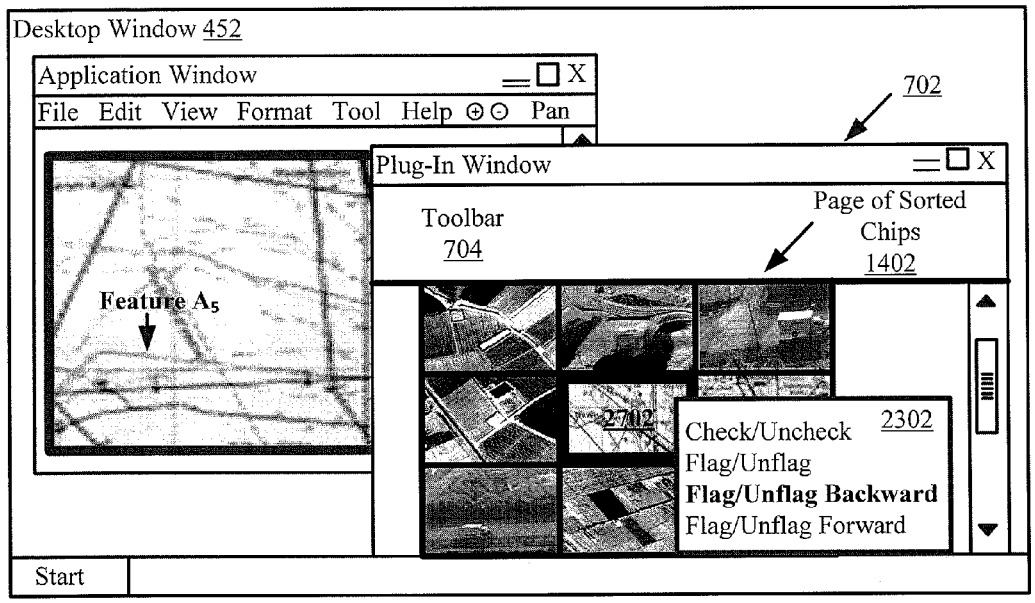
Figure 28:
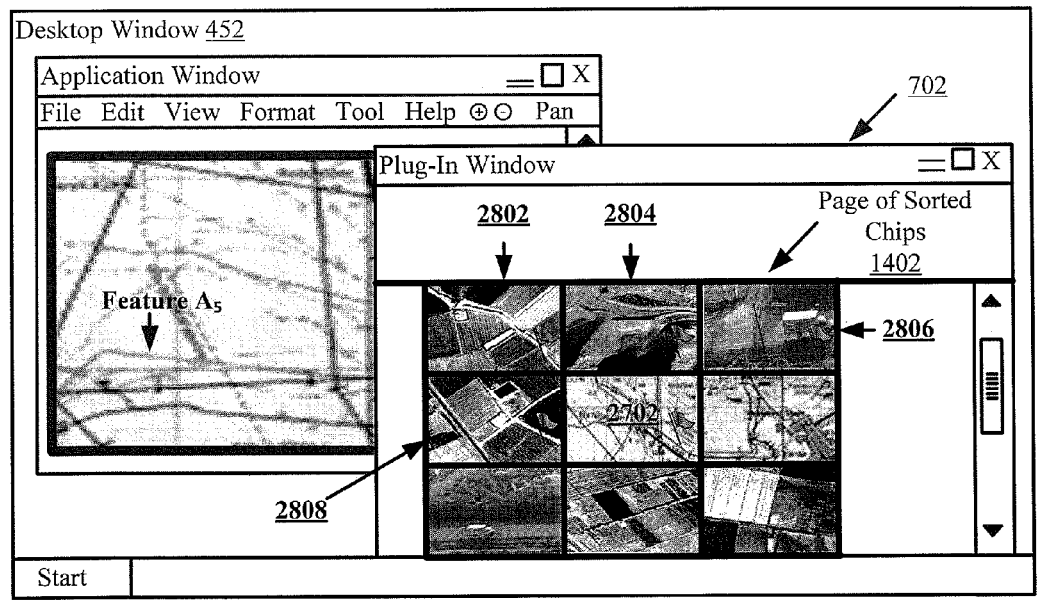
FIG. 28 is a schematic illustration of a plurality of "flagged backward" chips that is useful for understanding the present invention.
Figure 29:
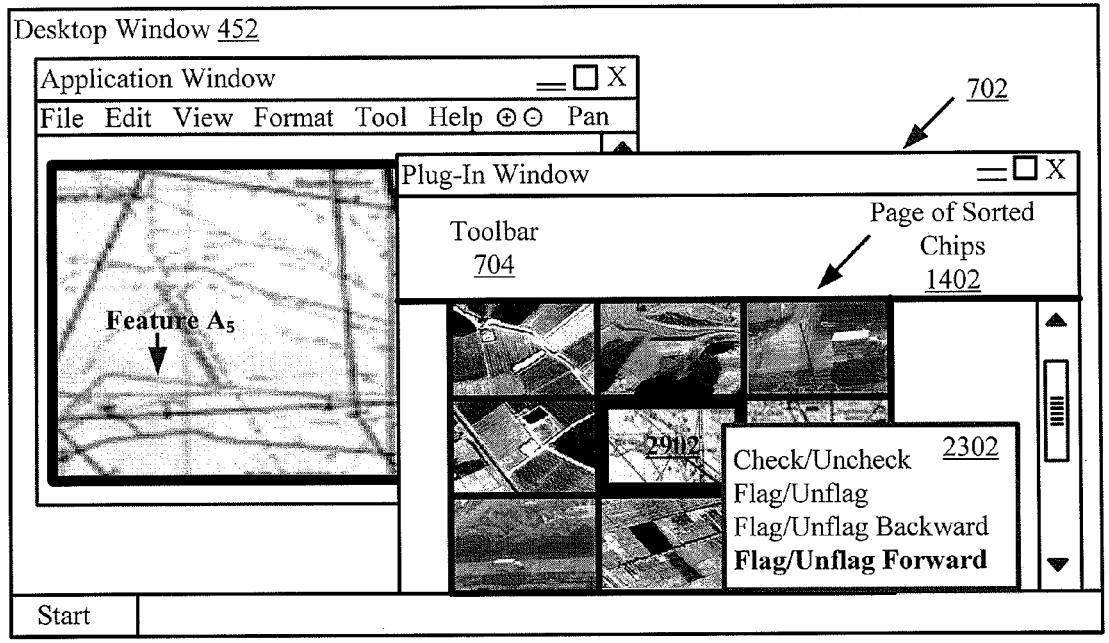
Figure 30:
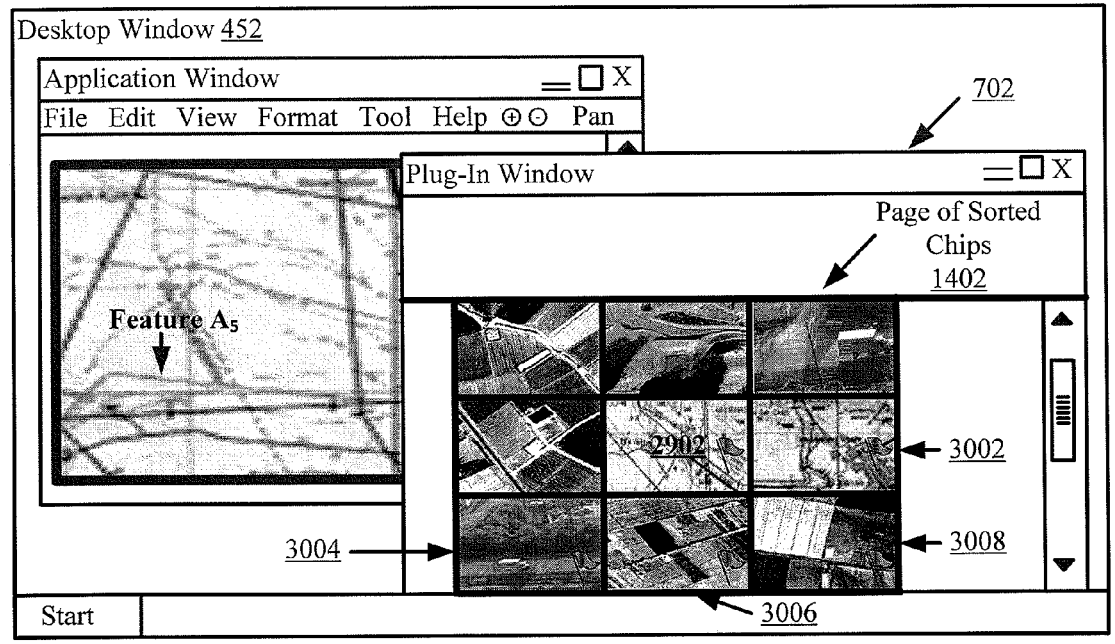
FIG. 30 is a schematic illustration of a plurality of "flagged forward" chips that is useful for understanding the present invention.

Schematic illustrations of exemplary selected chips 2702, 2902 and exemplary menus 2302 are provided in FIGS. 27 and 29. As shown in FIGS. 27 and 29, the selected chip 2702, 2902 is annotated with a relatively thick and distinctly colored border. Also, the selected command "Flag/Unflag Backward" or "Flag/Unflag Forward" of the menu 2302 is annotated by bolding the text thereof. Embodiments of the present invention are not limited in this regard. Any type of mark or annotation can be used to illustrate that a particular chip image has been selected and/or that a particular command of a menu has been selected.

Referring again to FIG. 3G, the method 300 continues with step 376. In step 376, the feature analysis plug-in performs operations to add a mark or annotation to the selected chip (e.g., chip 2702 of FIG. 27 or chip 2902 of FIG. 29) and to all of the chips which precede or succeed the selected chip in a sorted order (e.g., chips 2802-2808 of FIG. 28 and chips 3002-3008 of FIG. 30). Upon completing step 376, step 377 is performed where all of the "flagged" chips are exported to a table or file. The exportation can be initiated by a user of the computing device using a GUI widget (e.g., GUI widget 816 or 818 of FIG. 8A) of the plug-in window.

In a next step 378, the computing device (e.g., computing device 102 of FIG. 1) receives a user input for unflagging all of the "flagged" chips. In response to the user input of step 378, step 379 is performed where the marks or annotations are removed from the "flagged" chips. Subsequently, step 380 is performed where the method ends or other processing is performed.

Notably, the steps of FIGS. 3A-3G can be performed in a different order than that shown. Also, the above described method 300 can include more or less steps than those shown in FIGS. 3A-3G. For example, the method 300 can additionally include steps directed to generating and displaying at least one "temporally zoomed" video chip. Such steps can involve: receiving a user input for viewing "temporally zoomed" video chips comprising a selected video chip which is currently displayed in the plug-in window; automatically creating a screen page of "temporally zoomed" video chips; and displaying the screen page of "temporally zoomed" video chips in the plug-in window.

Figure 31:
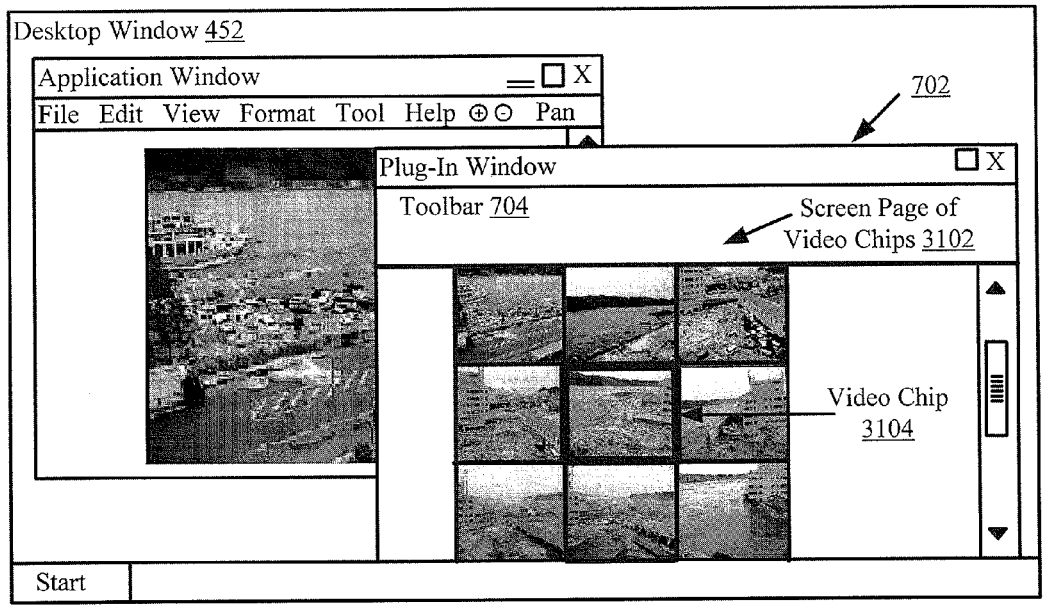
FIG. 31 is a schematic illustration of an exemplary selected video chip that is useful for understanding the present invention.
Figure 32:
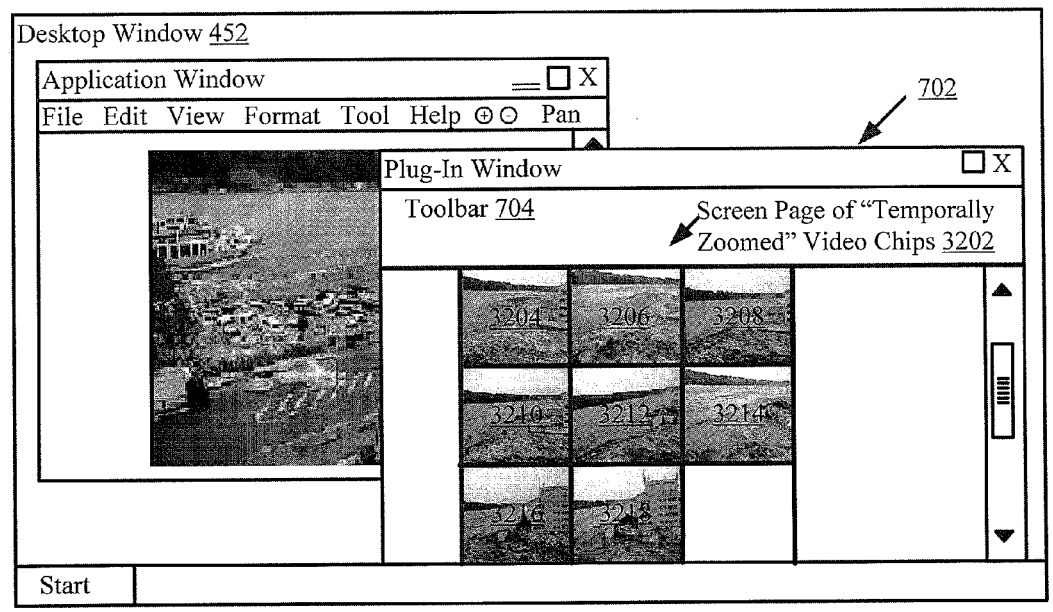
FIG. 32 is a schematic illustration of an exemplary screen page of a "temporally zoomed" video chip that is useful for understanding the present invention.

A schematic illustration is provided in FIG. 31 of an exemplary selected video chip 3104 of a displayed screen page 3102 from which "temporally zoomed" video chips should be made. A schematic illustration of a plurality of an exemplary screen page of "temporally zoomed" video chips 3202 is provided in FIG. 32. As shown in FIGS. 31-32, the selected video chip 3104 has been broken into a plurality of sub-segments 3204-3218. The sub-segments 3204-3218 have the same temporal level of resolution (or duration) which is less than that of the selected video chip 3104.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficient spatial feature data analysis, comprising:
    receiving, by a computing device, a user input for selecting a feature contained in a geographical area of interest visually represented within a first image via a user-software interaction directly with the first image displayed in a display area of an application window;
    in response to the user-software interaction, simultaneously and dynamically generating, by the computing device, (1) a plurality of chip images using image data defining said first image and (2) a plurality of video chips using video data defining at least a first video stream, where
        the feature selected by the user input and a feature contained in at least one said chip image or video chip comprise multi-dimensional representations of different objects which have at least one attribute in common;
    generating, by said computing device, at least one array comprising (1) a plurality of grid cells in which at least a portion of said plurality of chip images is presented, (2) a portion of said plurality of video chips is presented, or (3) portions of both of said plurality of chip images and said plurality of video chips are presented; and
    displaying, by said computing device, said array in a Graphical User Interface ("GUI") window thereof;
    wherein each of said plurality of chip images comprises at least one of a panned-only view, a zoomed-only view, and a panned-and-zoomed view of said first image including a first visual representation of at least one first object of a particular type; and
    wherein each of said plurality of video chips comprises a segment of said first video stream which comprises a second visual representation of at least one second object of said particular type.

2. The method according to claim 1, further comprising automatically identifying, by said computing device, visual representations of said first and second objects of said particular type which are contained in said first image and said first video stream, said first and second objects being the same object.

3. The method according to claim 1, wherein said plurality of chip images and said plurality of video chips are generated in response to a selection of a feature contained in an image or a video stream displayed in an application window.

4. The method according to claim 1, further comprising concurrently playing all video chips of said array.

5. The method according to claim 1, further comprising cycling through a plurality of screen pages comprising a plurality of arrays in which chips for a plurality of data sources are presented.

6. The method according to claim 5, wherein each of said plurality of arrays comprises chips generated using a different one of said plurality of data sources.

7. The method according to claim 5, wherein each of said plurality of arrays comprises chips generated using at least two sources of said plurality of data sources.

8. The method according to claim 7, wherein the at least two sources comprise an image and a video stream.

9. The method according to claim 1, further comprising:
    generating, by said computing device, a plurality of screen pages comprising said plurality of chip images and said plurality of video chips when a selected feature class has more than a maximum number of features that can fit in an array of a pre-defined size;
    wherein each of said plurality of screen pages comprises chips that are different than the chip images and the video chips of all other screen pages of said plurality of screen pages.

10. The method according to claim 9, further comprising paging forward or backward, by said computing device, through said plurality of screen pages.

11. A system, comprising:
    at least one computing device configured to:
        receive a user input for selecting a feature contained in a geographical area of interest visually represented within a first image via a user-software interaction directly with the first image displayed in a display area of an application window;
        in response to the user-software interaction, simultaneously and dynamically generate (1) a plurality of chip images using image data defining said first image and (2) a plurality of video chips using video data defining at least a first video stream, where
            the feature selected by the user input and a feature contained in at least one said chip image or video chip comprise multi-dimensional representations of different objects which have at least one attribute in common;
        generate at least one array comprising a plurality of grid cells in which at least (1) a portion of said plurality of chip images is presented, (2) a portion of said plurality of video chips is presented, or (3) portions of both of said plurality of chip images and said plurality of video chips are presented; and
        display said array in a Graphical User Interface ("GUI") window thereof;
    wherein each of said plurality of chip images comprises at least one of a panned-only view, a zoomed-only view, and a panned-and-zoomed view of said first image including a first visual representation of at least one first object of a particular type; and
    wherein each of said plurality of video chips comprises a segment of said first video stream which comprises a second visual representation of at least one second object of said particular type.

12. The system according to claim 11, wherein said computing device is further configured to automatically identify visual representations of said first and second objects of said particular type which are contained in said first image and said first video stream, said first and second objects being the same object.

13. The system according to claim 11, wherein said plurality of chip images and said plurality of video chips are generated in response to a selection of a feature contained in an image or a video stream displayed in an application window.

14. The system according to claim 11, wherein said computing device is further configured to concurrently play all video chips of said array.

15. The system according to claim 11, wherein said computing device is further configured to cycle through a plurality of screen pages comprising a plurality of arrays in which chips for a plurality of data sources are presented.

16. The system according to claim 15, wherein each of said plurality of arrays comprises chips generated using a different one of said plurality of data sources.

17. The system according to claim 15, wherein each of said plurality of arrays comprises chips generated using at least two sources of said plurality of data sources.

18. The system according to claim 17, wherein the at least two sources comprise an image and a video stream.

19. The system according to claim 11, wherein said computing device is further configured to:
   generate a plurality of screen pages comprising said plurality of chip images and said plurality of video chips when a selected feature class has more than a maximum number of features that can fit in an array of a predefined size;
   wherein each of said plurality of screen pages comprises chips that are different than the chips images and the video chips of all other screen pages of said plurality of screen pages.

20. The system according to claim 19, wherein said computing device is further configured to page forward or backward through said plurality of screen pages.

\* \* \* \* \*